US012695928B2

(12) United States Patent
Ma et al.

(10) Patent No.: US 12,695,928 B2
(45) Date of Patent: Jul. 28, 2026

(54) VIDEO TRANSMISSION METHOD, VIDEO TRANSMISSION APPARATUS, ELECTRONIC DEVICE AND READABLE MEDIUM

(71) Applicant: BOE TECHNOLOGY GROUP CO., LTD., Beijing (CN)

(72) Inventors: Xitong Ma, Beijing (CN); Tao Li, Beijing (CN); Lihua Geng, Beijing (CN); Youxiang Xia, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 452 days.

(21) Appl. No.: 18/031,178

(22) PCT Filed: Apr. 29, 2022

(86) PCT No.: PCT/CN2022/090371
§ 371 (c)(1),
(2) Date: Apr. 11, 2023

(87) PCT Pub. No.: WO2023/206389
PCT Pub. Date: Nov. 2, 2023

(65) Prior Publication Data
US 2024/0373077 A1 Nov. 7, 2024

(51) Int. Cl.
*H04N 21/2347* (2011.01)
*H04L 9/08* (2006.01)
*H04N 21/231* (2011.01)

(52) U.S. Cl.
CPC ....... *H04N 21/2347* (2013.01); *H04L 9/0869* (2013.01); *H04N 21/23106* (2013.01)

(58) Field of Classification Search
CPC ..... H04L 67/12; H04L 63/0428; H04L 67/02; H04L 9/50; H04L 67/10;
(Continued)

(56) References Cited

U.S. PATENT DOCUMENTS 7,825,950 B2 * 11/2010 Rottmann ............ G06V 40/161
348/78
9,953,187 B2 * 4/2018 Rylski ...................... H04N 7/18
(Continued)

FOREIGN PATENT DOCUMENTS

CN 103716637 A 4/2014
CN 107172429 A 9/2017
(Continued)

*Primary Examiner* — Sharif E Ullah
(74) *Attorney, Agent, or Firm* — HOUTTEMAN LAW LLC

(57) ABSTRACT

The present disclosure provides a video transmission method, a video transmission apparatus, an electronic device, and a readable medium, belongs to the field of information transmission technology, and can solve the problem of security of information transmission. The video transmission method of the present disclosure includes: acquiring block data of a video stream to be transmitted; generating an encryption key for an $r^{th}$ block with a block data digest of an $(r-1)^{th}$ block, wherein r is an integer greater than or equal to 2; encrypting block video data of the $r^{th}$ block with the encryption key for the $r^{th}$ block, to obtain block encrypted video data of the $r^{th}$ block; and transmitting the block encrypted video data of the $r^{th}$ block to a receiving end.

10 Claims, 4 Drawing Sheets

(58) Field of Classification Search
CPC . H04L 2012/40215; H04L 2012/40273; H04L 63/105; H04W 4/70; H04W 4/80; H04W 84/12; H04W 12/04; H04W 12/02; H04W 12/06; H04W 88/06; H04W 4/06; G06F 3/0488; G06F 3/0484; G06F 3/017; G06F 3/0482; G06F 11/2035; G06F 13/14; G06F 3/013; G06F 21/62; H04N 21/2347
USPC ........ 380/226, 255, 264, 276; 726/2, 21, 36; 713/150, 163, 181
See application file for complete search history.

(56) References Cited

U.S. PATENT DOCUMENTS

| | | | | |
|---|---|---|---|---|
| 10,162,943 | B2 * | 12/2018 | Park | H04L 63/08 |
| 2002/0146118 | A1 | 10/2002 | Disanto et al. | |
| 2003/0174842 | A1 * | 9/2003 | Challener | H04L 63/061 |
| | | | | 380/277 |
| 2005/0132204 | A1 * | 6/2005 | Gouguenheim | G06F 21/10 |
| | | | | 713/193 |
| 2007/0002141 | A1 * | 1/2007 | Lipton | H04N 7/18 |
| | | | | 348/143 |
| 2007/0057048 | A1 * | 3/2007 | Plotkin | H04L 63/0428 |
| | | | | 235/382 |
| 2008/0027864 | A1 * | 1/2008 | Lin | H04L 9/0861 |
| | | | | 705/50 |
| 2008/0109642 | A1 * | 5/2008 | Beutler | G06F 11/1637 |
| | | | | 712/225 |
| 2008/0117295 | A1 * | 5/2008 | Ebrahimi | G08B 13/19604 |
| | | | | 348/143 |
| 2009/0328177 | A1 * | 12/2009 | Frey | H04L 9/3213 |
| | | | | 726/9 |
| 2010/0017615 | A1 * | 1/2010 | Boesgaard | G06F 21/606 |
| | | | | 713/176 |
| 2010/0257578 | A1 * | 10/2010 | Shukla | G06F 21/6218 |
| | | | | 726/1 |
| 2011/0145581 | A1 * | 6/2011 | Malhotra | H04L 9/3271 |
| | | | | 725/91 |
| 2012/0324552 | A1 * | 12/2012 | Padala | H04L 9/3213 |
| | | | | 726/6 |
| 2013/0219178 | A1 * | 8/2013 | Xiques | H04L 65/70 |
| | | | | 713/168 |
| 2013/0318358 | A1 * | 11/2013 | Wang | H04L 9/0866 |
| | | | | 713/182 |
| 2014/0023248 | A1 * | 1/2014 | Yoo | G08B 13/19686 |
| | | | | 382/118 |
| 2014/0079221 | A1 * | 3/2014 | McCallum | H04L 9/0822 |
| | | | | 380/277 |
| 2014/0331297 | A1 * | 11/2014 | Innes | H04L 63/0884 |
| | | | | 726/7 |
| 2015/0222697 | A1 * | 8/2015 | Bassiouny | H04L 65/65 |
| | | | | 709/203 |
| 2017/0316185 | A1 * | 11/2017 | Park | G06F 21/105 |
| 2017/0358195 | A1 * | 12/2017 | Bobda | G08B 13/19613 |
| 2018/0174414 | A1 * | 6/2018 | Edpalm | H04N 19/136 |
| 2020/0013431 | A1 * | 1/2020 | Ueda | H04N 9/8042 |

FOREIGN PATENT DOCUMENTS

| | | |
|---|---|---|
| CN | 208754457 U | 4/2019 |
| CN | 111615106 A | 9/2020 |
| CN | 112104454 A | 12/2020 |
| CN | 110730366 B | 8/2021 |
| EP | 1395058 A1 | 3/2004 |

* cited by examiner

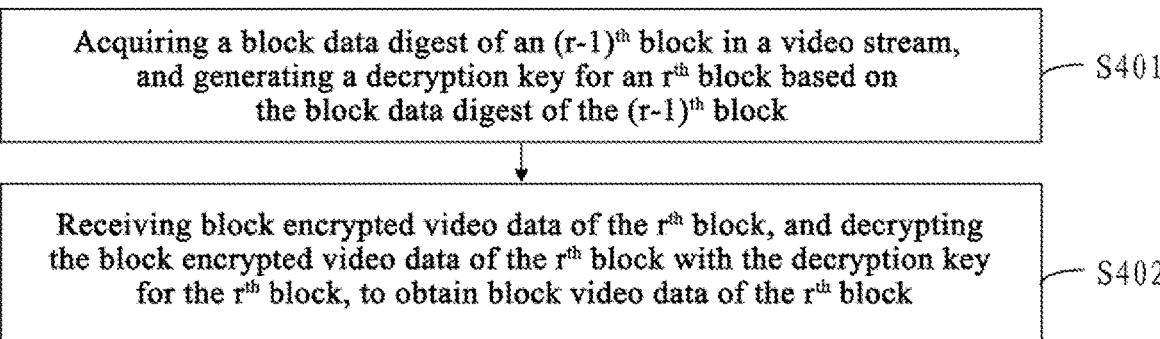

Acquiring a block data digest of an $(r-1)^{th}$ block in a video stream, and generating a decryption key for an $r^{th}$ block based on the block data digest of the $(r-1)^{th}$ block — S401

Receiving block encrypted video data of the $r^{th}$ block, and decrypting the block encrypted video data of the $r^{th}$ block with the decryption key for the $r^{th}$ block, to obtain block video data of the $r^{th}$ block — S402

FIG. 4

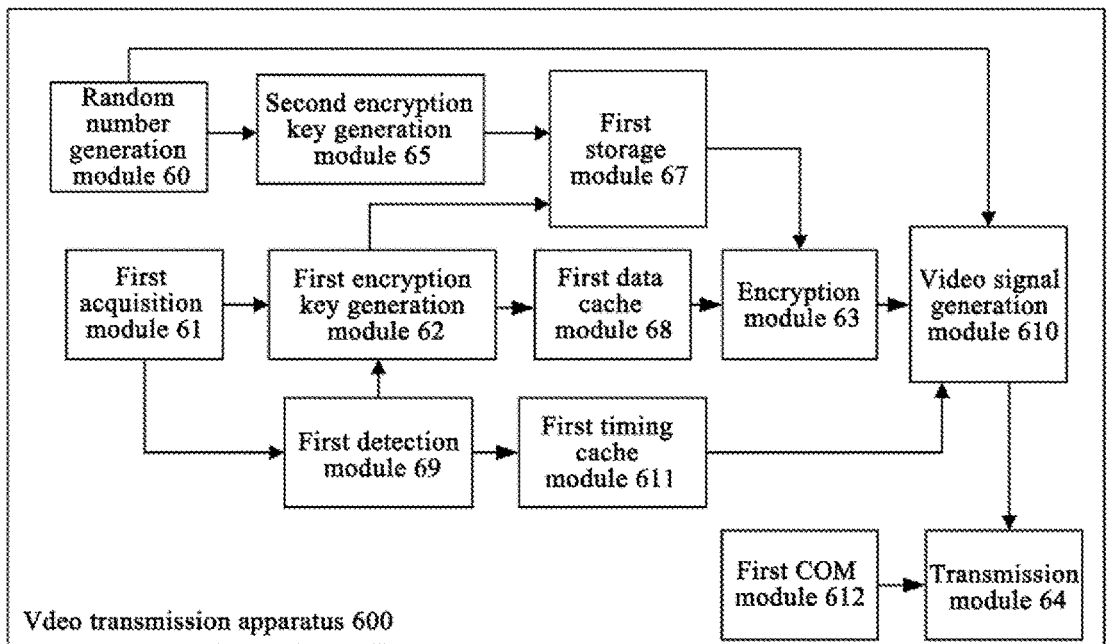

FIG. 5

Video transmission apparatus 600

Random number generation module 60 → Second encryption key generation module 65 → First storage module 67

First acquisition module 61 → First encryption key generation module 62 → First data cache module 68 → Encryption module 63 → Video signal generation module 610

First detection module 69 → First timing cache module 611

First COM module 612 → Transmission module 64

FIG. 6

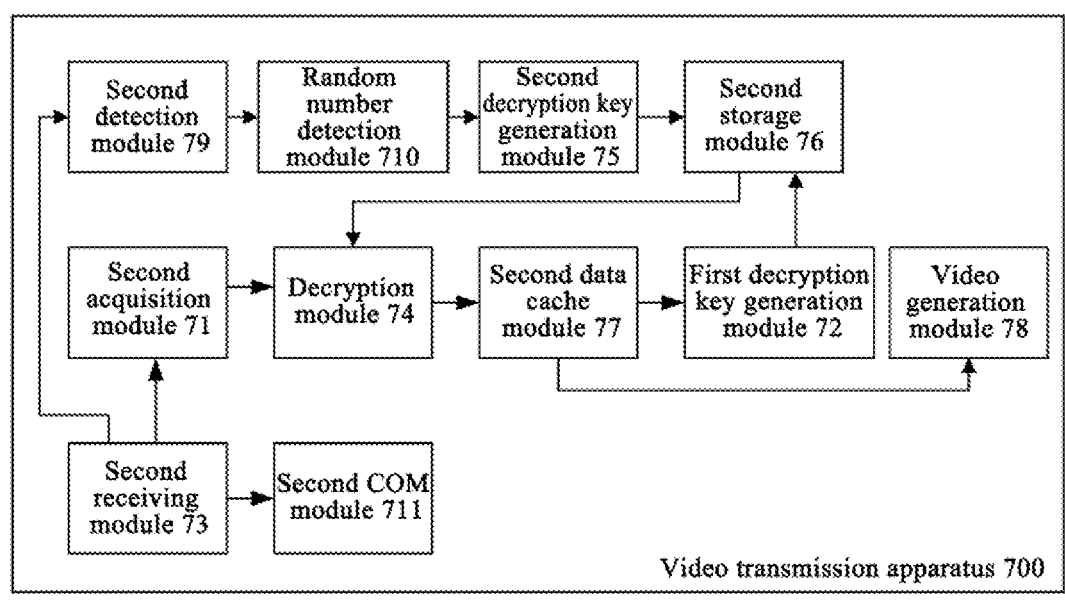

FIG. 7

S803 — Generating a random number

S801 — Receiving an encryption instruction transmitted by an encryption key

S804 — Generating an encryption key for a 1ˢᵗ line in a 1ˢᵗ frame

S802 — Detecting an edge of a frame synchronization signal

S805 — Whether the line video data of the 1ˢᵗ line in the 1ˢᵗ frame?    No    Yes S806 — Obtaining line encrypted data of the 1ˢᵗ line in the 1ˢᵗ frame S807 — Calculating an encryption key for a pᵗʰ line according to a line data digest of a (p-1)ᵗʰ line S808 — Obtaining line encrypted video data of the pᵗʰ line S809 — Superposing the line encrypted video data with the random number S810 — Transmitting a line video signal

FIG. 8

VIDEO TRANSMISSION METHOD, VIDEO TRANSMISSION APPARATUS, ELECTRONIC DEVICE AND READABLE MEDIUM

TECHNICAL FIELD

The present disclosure belongs to the field of information transmission technology, and in particular relates to a video transmission method, a video transmission apparatus, an electronic device, and a readable medium.

BACKGROUND

With the development of network and multimedia, more and more video data are transmitted in the network, and different video data have different requirements on transmission security. For example, the requirements on security are low for video data generated by an online lecture. The requirements on security are higher for video data generated by video monitoring and a confidential video conference. For video data with high requirements on security, a risk of being tampered or eavesdropped during transmission is required to be reduced.

SUMMARY

The present disclosure aims to provide a video transmission method, a video transmission apparatus, an electronic device, and a readable medium.

A first aspect of the present disclosure provides a video transmission method applied to a transmitting end, including:

acquiring block data of a video stream to be transmitted;

generating an encryption key for an $r^{th}$ block with a block data digest of an $(r-1)^{th}$ block, where r is an integer greater than or equal to 2;

encrypting block video data of the $r^{th}$ block with the encryption key for the $r^{th}$ block, to obtain block encrypted video data of the $r^{th}$ block; and transmitting the block encrypted video data of the $r^{th}$ block to a receiving end.

Prior to the encrypting block video data of the $r^{th}$ block with the encryption key for the $r^{th}$ block, to obtain block encrypted video data of the $r^{th}$ block, the video transmission method further includes:

storing the encryption key for the $r^{th}$ block in a preset first storage module;

receiving the block video data of the $r^{th}$ block, and caching the block video data of the $r^{th}$ block; and monitoring a cache state of the block video data of the $r^{th}$ block.

The encrypting block video data of the $r^{th}$ block with the encryption key for the $r^{th}$ block, to obtain block encrypted video data of the $r^{th}$ block, includes:

encrypting cached block video data of the $r^{th}$ block with the encryption key for the $r^{th}$ block, to obtain the block encrypted video data of the $r^{th}$ block, in response to the cache state of the block video data of the $r^{th}$ block is that all the block video data of the $r^{th}$ block are cached.

The transmitting the block encrypted video data of the $r^{th}$ block to a receiving end, includes:

matching the block encrypted video data of the $r^{th}$ block with a cached timing signal, to obtain a block video signal of the $r^{th}$ block; and transmitting the block video signal of the $r^{th}$ block to the receiving end.

Prior to the generating an encryption key for an $r^{th}$ block of data, with a block data digest of an $(r-1)^{th}$ block, the video transmission method further includes:

generating an encryption key for a $1^{st}$ block of the video stream to be transmitted based on a random number, where the random number is generated by a random number generation module;

encrypting block video data of the $1^{st}$ block with the encryption key for the $1^{st}$ block, to obtain block encrypted video data of the $1^{st}$ block; and transmitting the block encrypted video data of the $1^{st}$ block to the receiving end.

The random number is transmitted to the receiving end during a block blanking period of a video signal of the $1^{st}$ block.

The block data includes any one of frame data or line data.

The block data includes M frames of frame data, each of the M frames of frame data includes N lines of line data, where N is an integer greater than 2; and the video transmission method further includes:

generating an encryption key for a $1^{st}$ line in an $m^{th}$ frame, based on a line data digest of an $N^{th}$ line in an $(m-1)^{th}$ frame;

encrypting video data of the $1^{st}$ line in the $m^{th}$ frame, with the encryption key for the $1^{st}$ line in the $m^{th}$ frame, to obtain line encrypted video data of the $1^{st}$ line in the $m^{th}$ frame; and transmitting the line encrypted video data of the $1^{st}$ line in the $m^{th}$ frame to the receiving end.

Prior to generating an encryption key for a $1^{st}$ block of the video stream to be transmitted based on a random number, the video transmission method further includes:

monitoring an edge of a frame synchronization signal in response to an encryption instruction for encrypting the video stream to be transmitted, and determining a positions of the $1^{st}$ block of the video stream to be transmitted.

A second aspect of the present disclosure provides a video transmission method applied to a receiving end, including:

acquiring a block data digest of an $(r-1)^{th}$ block in a video stream, and generating a decryption key for an $r^{th}$ block based on the block data digest of the $(r-1)^{th}$ block, where r is an integer greater than or equal to 2; and receiving block encrypted video data of the $r^{th}$ block, and decrypting the block encrypted video data of the $r^{th}$ block with the decryption key for the $r^{th}$ block, to obtain block video data of the $r^{th}$ block.

Prior to the receiving block encrypted video data of the $r^{th}$ block and decrypting the block encrypted video data of the $r^{th}$ block with the decryption key for the $r^{th}$ block, to obtain block video data of the $r^{th}$ block, the video transmission method further includes:

storing the decryption key for the $r^{th}$ block in a preset second storage module;

caching the received block encrypted video data of the $r^{th}$ block; and monitoring a cache state of the block encrypted video data of the $r^{th}$ block.

The receiving block encrypted video data of the $r^{th}$ block and decrypting the block encrypted video data of the $r^{th}$ block with the decryption key for the $r^{th}$ block, to obtain block video data of the $r^{th}$ block, includes:

decrypting cached block encrypted video data of the $r^{th}$ block with the decryption key for the $r^{th}$ block, to obtain the block video data of the $r^{th}$ block, in response to the cache state of the block encrypted video data of the $r^{th}$ block is that all the block encrypted video data of the $r^{th}$ block are cached.

Prior to the acquiring a block data digest of an $(r-1)^{th}$ block in a video stream, and generating a decryption key for an $r^{th}$ block based on the block data digest of the $(r-1)^{th}$ block, the video transmission method further includes:

generating a decryption key for a $1^{st}$ block based on a random number, where the random number is generated by a random number generation module arranged at a transmitting end; and receiving the block encrypted video data of the $1^{st}$ block, and decrypting the block encrypted video data of the $1^{st}$ block with the decryption key for the $1^{st}$ block, to obtain block video data of the $1^{st}$ block.

The block data includes any one of frame data or line data.

The block data includes M frames of frame data, each of the M frames of frame data includes N lines of data, where N is an integer greater than 2; and the video transmission method includes:

acquiring line data digest of an $N^{th}$ line in an $(m-1)^{th}$ frame, and generating a decryption key for a $1^{st}$ line in an $m^{th}$ frame with the line data digest of the $N^{th}$ line in the $(m-1)^{th}$ frame; and receiving line encrypted video data of the $1^{st}$ line in the $m^{th}$ frame, and decrypting the line encrypted video data of the $1^{st}$ line in the $m^{th}$ frame, with the decryption key for the $1^{st}$ line in the $m^{th}$ frame, to obtain line video data of the $1^{st}$ line in the $m^{th}$ frame.

The video transmission method further includes: detecting an edge of a frame synchronization signal, and acquiring a random number at the edge of the frame synchronization signal, in response to a key receiving instruction transmitted by a transmitting end.

A third aspect of the present disclosure provides a video transmission apparatus applied to a transmitting end, including:

a first acquisition module, configured to acquire block data of a video stream to be transmitted;

a first encryption key generation module, configured to generate an encryption key for an $r^{th}$ block with a block data digest of an $(r-1)^{th}$ block, where r is an integer greater than or equal to 2;

an encryption module, configured to encrypt block video data of the $r^{th}$ block with the encryption key for the $r^{th}$ block, to obtain block encrypted video data of the $r^{th}$ block; and a transmission module, configured to transmit the block encrypted video data of the $r^{th}$ block to a receiving end.

The video transmission apparatus further includes:

a first storage module, configured to store the encryption key for the $r^{th}$ block; and a first data cache module, configured to cache block video data of the $r^{th}$ block, and detect a cache state of the block video data of the $r^{th}$ block.

The video transmission apparatus further includes:

a second encryption key generation module, configured to generate an encryption key for a $1^{st}$ block of the video stream to be transmitted based on a random number, where the encryption module is further configured to encrypt the block video data of the $1^{st}$ block with the encryption key for the $1^{st}$ block, to obtain block encrypted video data of the $1^{st}$ block; and the transmission module is further configured to transmit the block encrypted video data of the $1^{st}$ block to the receiving end.

The video transmission apparatus further includes a video signal generation module and a first timing cache module, and the video signal generation module includes a superposition unit and a matching unit, where the superposition unit is configured to superpose the block encrypted video data of the $1^{st}$ block with the random number, to obtain block superposed video data of the $1^{st}$ block;

the first timing cache module is configured to perform block caching on a timing signal; and the matching unit is configured to match the block superposed video data of the $1^{st}$ block with the timing signal subjected to the block caching, to obtain a block video signal of the $1^{st}$ block.

The video signal generation module is further configured to match the block encrypted video data of the $r^{th}$ block with the cached timing signal, to obtain a block video signal of the $r^{th}$ block.

The video transmission apparatus further includes: a random number generation module configured to generate the random number.

The video transmission apparatus further includes:

a first detection module, configured to detect an edge of a frame synchronization signal in response to an encryption instruction for encrypting the video stream to be transmitted, to determine a position of the $1^{st}$ block of the video stream to be transmitted.

A fourth aspect of the present disclosure provides a video transmission apparatus applied to a receiving end, including:

a second acquisition module, configured to acquire a block data digest of an $(r-1)^{th}$ block in a video stream;

a first decryption key generation module, configured to generate a decryption key for an $r^{th}$ block, based on the block data digest of the $(r-1)^{th}$ block, where r is an integer greater than or equal to 2;

a second receiving module, configured to receive block encrypted video data of the $r^{th}$ block; and a decryption module, configured to decrypt the block encrypted video data of the $r^{th}$ block with the decryption key for the $r^{th}$ block, to obtain block video data of the $r^{th}$ block.

The video transmission apparatus further includes:

a second decryption key generation module, configured to generate a decryption key for a $1^{st}$ block based on a random number generated by a random number generation module at a transmitting end, where the second receiving module is further configured to receive the block encrypted video data of the $1^{st}$ block; and the decryption module is further configured to decrypt the block encrypted video data of the $1^{st}$ block with the decryption key for the $1^{st}$ block, to obtain block video data of the $1^{st}$ block.

The video transmission apparatus further includes:

a second storage module, configured to store the decryption key for the $r^{th}$ block; and a second data cache module, configured to cache the received block encrypted video data of the $r^{th}$ block and monitor a cache state of the block encrypted video data of the $r^{th}$ block.

The video transmission apparatus further includes:

a second detection module, configured to detect an edge of a frame synchronization signal in response to a key receiving instruction transmitted by the transmitting end; and a random number detection module, configured to obtain the random number from the block encrypted video data of the $1^{st}$ block at an edge of a block synchronization signal.

A fifth aspect of the present disclosure provides an electronic device, including:

one or more processors; and a memory for storing one or more programs which, when being executed by the one or more processors, cause the one or more processors to implement the video transmission method according to any one of the embodiments of the present disclosure.

A sixth aspect of the present disclosure provides a non-transitory computer readable medium storing a computer program which, when being executed by a processor, implements the steps in the video transmission method according to any one of the embodiments of the present disclosure.

BRIEF DESCRIPTION OF DRAWINGS

FIG. 4 is a flowchart of a video transmission method according to an embodiment of the present disclosure;

FIG. 5 is a timing diagram illustrating a process of decrypting line encrypted video data according to an embodiment of the present disclosure;

FIG. 6 is a schematic diagram illustrating a structure of a video transmission apparatus according to an embodiment of the present disclosure;

FIG. 7 is a schematic diagram illustrating a structure of a video transmission apparatus according to an embodiment of the present disclosure;

FIG. 8 is a flowchart of a video transmission method according to an embodiment of the present disclosure;

DETAIL DESCRIPTION OF EMBODIMENTS

Figure 1:
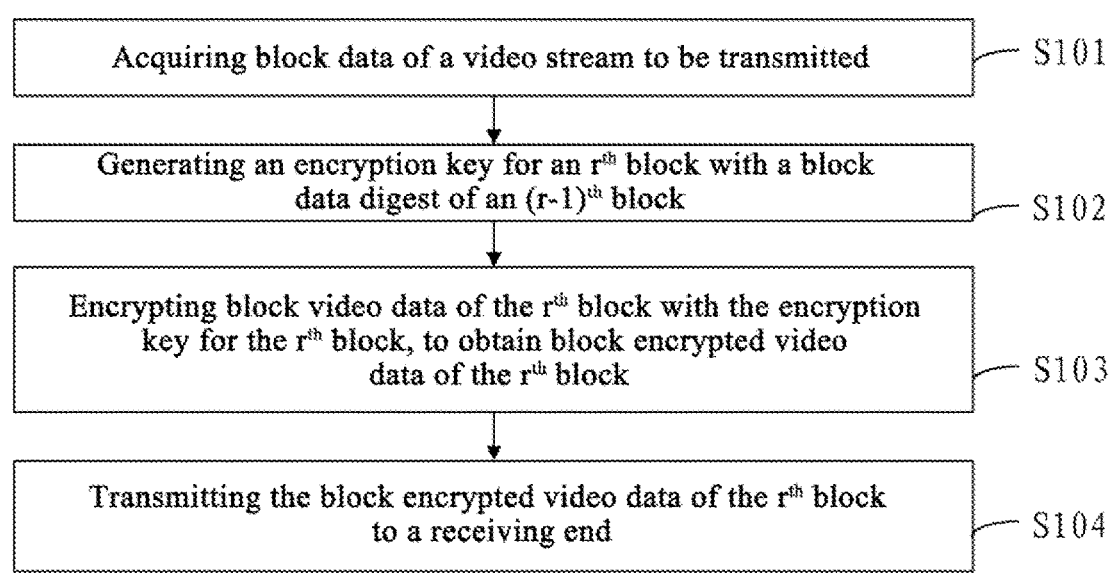
FIG. 1 is a flowchart of a video transmission method according to an embodiment of the present disclosure.

In order to enable one of ordinary skill in the art to better understand the technical solutions of the present disclosure, the present disclosure will be further described in detail below with reference to the accompanying drawings and specific embodiments.

Unless defined otherwise, technical or scientific terms used herein shall have the ordinary meaning as understood by one of ordinary skill in the art to which the present disclosure belongs. The use of "first", "second", and the like in the present disclosure is not intended to indicate any order, quantity, or importance, but rather serves to distinguish one element from another. Also, the term "a", "an", "the" or the like does not denote a limitation of quantity, but rather denotes the presence of at least one. The word "comprising", "comprises", or the like means that the element or item preceding the word includes the element or item listed after the word and its equivalent, but does not exclude other elements or items. The term "connected", "coupled" or the like is not restricted to physical or mechanical connections, but may include electrical connections, whether direct or indirect. The terms "upper", "lower", "left", "right", and the like are used only to indicate relative positional relationships, and when the absolute position of the object being described is changed, the relative positional relationships may also be changed accordingly.

In order to ensure security of a video stream in a transmission process, a transmitting end encrypts the video stream with a bit encryption technology prior to transmitting the video stream, and a receiving end decrypts the encrypted video stream after receiving the encrypted video stream, to obtain a plaintext of the video stream. However, the encryption level of the bit encryption technology is low, and the risk of divulging a secret still exists in the transmission process of the video stream.

A video transmission method and a video transmission apparatus according to an embodiment of the present disclosure are directed to an uncompressed video stream, where a transmitting end encrypts the video stream to be transmitted through a preset algorithm, and a receiving end decrypts the received video streams through the preset algorithm, to obtain a plaintext of the video stream.

In the video transmission method and the video transmission apparatus according to an embodiment of the present disclosure, the transmitting end encrypts the uncompressed video stream line by line, and the receiving end decrypts the uncompressed video stream line by line. Specifically, for the transmitting end, an encryption key adopted for a $1^{st}$ line in a $1^{st}$ frame of the uncompressed video stream is determined by a random number, and the encryption keys for the other lines in the $1^{st}$ frame are each determined based on a line data digest of a previous line. The encryption key for a $1^{st}$ line in an $m^{th}$ frame is determined by the line data digest of the last line of the $(m-1)^{th}$ frame, and the other lines in the $m^{th}$ frame are encrypted in the same manner as other lines in the $1^{st}$ frame. For the receiving end, a decryption key for the $1^{st}$ line in the $1^{st}$ frame is determined by the random number, and the decryption keys for other lines in the $1^{st}$ frame are each determined based on the line data digest of the previous line; the decryption key for the $1^{st}$ line in the $m^{th}$ frame is determined by the line data digest of the last line in the $(m-1)^{th}$ frame, and other lines in the $m^{th}$ frame are decrypted in the same manner as other lines in the $1^{st}$ frame.

In the embodiment of the present disclosure, the data digest may be frame data, line data, or user-defined data. For example, the user obtains a data digest based on the video data according to a predetermined algorithm. The generation manner of the data digest is not limited by the embodiment of the present disclosure.

FIG. 1 is a flowchart of a video transmission method according to an embodiment of the present disclosure. As shown in FIG. 1, the video transmission method includes the following steps S101 to S104.

Step S101, acquiring block data of a video stream to be transmitted.

In some embodiments, the video stream to be transmitted may be any one of a video stream generated during a video conference, a video stream generated by a monitoring camera, or a medical video stream obtained by a medical device. The video stream to be transmitted is not limited by the embodiment of the present disclosure.

The video stream in the embodiment of the present disclosure is an uncompressed video stream, the transmitting end may transmit the video stream frame by frame and line by line, and the receiving end may receive the video stream frame by frame and line by line.

In some embodiments, the video stream to be transmitted is transmitted in a form of block data, i.e., the video stream to be transmitted includes a plurality of consecutive blocks of video data. The block data may be a frame data or a line data, or may include both the frame data and the line data.

Step S102, generating an encryption key for an $r^{th}$ block with a block data digest of an $(r-1)^{th}$ block, where r is an integer greater than or equal to 2.

Step S103, encrypting block video data of the $r^{th}$ block with the encryption key for the $r^{th}$ block, to obtain block encrypted video data of the $r^{th}$ block.

Step S104, transmitting the block encrypted video data of the $r^{th}$ block to a receiving end.

In some embodiments, the transmitting end uses the block data digest of the $(r-1)^{th}$ block to generate the encryption key for the $r^{th}$ block, that is, uses the block data digest of a previous block to generate an encryption key for the current block, and encrypts the blocks of video data block by block, which can effectively improve the security of the data to be transmitted in the transmission process.

In some embodiments, prior to the encrypting block video data of the $r^{th}$ block with the encryption key for the $r^{th}$ block, to obtain block encrypted video data of the $r^{th}$ block, the method further includes:

Storing the encryption key for the $r^{th}$ block in a preset first storage module; receiving the block video data of the $r^{th}$ block, and caching the block video data of the $r^{th}$ block; and monitoring a cache state of the block video data of the $r^{th}$ block.

In some embodiments, the encrypting block video data of the $r^{th}$ block with the encryption key for the $r^{th}$ block, to obtain block encrypted video data of the $r^{th}$ block, includes:

If the cache state of the block video data of the $r^{th}$ block is that all the block video data of the $r^{th}$ block are cached, encrypting cached block video data of the $r^{th}$ block with the encryption key for the $r^{th}$ block, to obtain the block encrypted video data of the $r^{th}$ block.

In some embodiments, the transmitting the block encrypted video data of the $r^{th}$ block to a receiving end, includes: matching the block encrypted video data of the $r^{th}$ block with a cached timing signal, to obtain a block video signal of the $r^{th}$ block; and transmitting the block video signal of the $r^{th}$ block to the receiving end.

In some embodiments, prior to the generating an encryption key for an $r^{th}$ block of data, with a block data digest of an $(r-1)^{th}$ block, the method further includes:

Generating an encryption key for a $1^{st}$ block of the video stream to be transmitted based on a random number, where the random number is generated by a random number generation module; encrypting block video data of the $1^{st}$ block with the encryption key for the $1^{st}$ block, to obtain block encrypted video data of the $1^{st}$ block; and transmitting the block encrypted video data of the $1^{st}$ block to the receiving end.

In some embodiments, the random number is transmitted to the receiving end during a block blanking period of a video signal of the $1^{st}$ block.

In some embodiments, the data to be transmitted is transmitted in data frames, and each data frame includes a plurality of lines of video data. The encryption key for a $1^{st}$ line in a $1^{st}$ frame is obtained by a random number, according to an embodiment of the present disclosure.

Generating an encryption key for a $1^{st}$ line in a $1^{st}$ frame of the video stream to be transmitted based on a random number, where the random number is generated by a random number generation module; encrypting block video data of the $1^{st}$ line in th $1^{st}$ frame with the encryption key for the $1^{st}$ line in th $1^{st}$ frame, to obtain block encrypted video data of the $1^{st}$ line in th $1^{st}$ frame; and transmitting the block encrypted video data of the $1^{st}$ line in th $1^{st}$ frame to the receiving end. The random number is generated by a random number generation module. The random number generation module may be a random number generator, or may be other modules or units capable of generating the random number. The random number generation module is not limited by the embodiment of the present disclosure. The random number generation module generates the random numbers when being powered on.

In some embodiments, the transmitting end may obtain the encryption key through calculation with a private customized algorithm (e.g., SHA-128). Specifically, the transmitting end generates the encryption key (initial encryption key) for the $1^{st}$ block by the private customized algorithm using the random number. Illustratively, the SHA-128 algorithm is used to calculate the random number, to obtain a 128-bit hash value, which is the encryption key for the block data of the $1^{st}$ block.

Although the encryption keys for different frames and different lines are determined by the same encryption algorithm, since the encryption key for the $1^{st}$ line in the $1^{st}$ frame of the video stream is determined based on the random number and other keys are determined based on line data digests, the encryption key for the $1^{st}$ line in the $1^{st}$ frame and other encryption keys are determined by different encryption key generation modules, respectively.

In an embodiment of the present disclosure, a first encryption key generation module rotates the random number to the left by 64 bits, and change all the bits one by one, and then adds 1 to the changed random number. The specific expression formula of the encryption key for the $1^{st}$ line in the $1^{st}$ frame may be as follows:

$$(\text{INITIAL\_KEY})=\sim\{\text{RANDOM}[64:127],\text{RANDOM}[0:63]\}+1.$$

In some embodiments, the video stream to be transmitted includes m number of video frames, and each video frame includes N lines of video data, where N is an integer greater than 2. In the embodiment of the present disclosure, an $N^{th}$ line in an $(m-1)^{th}$ frame is defined as a previous frame of a $1^{st}$ line in an $m^{th}$ frame. Thus, the encryption key for the $1^{st}$ line in the $m^{th}$ frame is obtained as described in the following text.

In order to better understand the video transmission method, the following description takes an example that the block data includes M frames of frame data, and each frame of frame data includes N lines of line data.

Step S21, generating the encryption key for the $1^{st}$ line in the $1^{st}$ frame of the video stream to be transmitted based on the random number. Step S22, encrypting line video data of the $1^{st}$ line in the $1^{st}$ frame with the encryption key for the $1^{st}$ line in the $1^{st}$ frame, to obtain line encrypted video data of the $1^{st}$ line in the $1^{st}$ frame.

The line encrypted video data of the $1^{st}$ line in the $1^{st}$ frame are ciphertext data to be transmitted.

Step S23, transmitting the line encrypted video data of the $1^{st}$ line in the $1^{st}$ frame to the receiving end.

Step S24, acquiring a line data digest of an $(n-1)^{th}$ line in the $1^{st}$ frame, and generating an encryption key for an $n^{th}$ line in the $1^{st}$ frame based on the line data digest of the $(n-1)^{th}$ line in the $1^{st}$ frame, where n is an integer greater than or equal to 2.

In some embodiments, the $1^{st}$ frame includes N lines of video data, and when the lines of video data in the $1^{st}$ frame are encrypted, the line data digest of the $(n-1)^{th}$ line is used to determine the encryption key for the $n^{th}$ line, so as to obtain the encryption key for a respective line other than the $1^{st}$ line.

Illustratively, the SHA-128 algorithm is used to calculate the line data digest of the $(n-1)^{th}$ line in the $1^{st}$ frame, to obtain a 128-bit hash value, which is the encryption key for the line data of the $(n-1)^{th}$ line in the $1^{st}$ frame.

Step S25, encrypting line video data of the $n^{th}$ line in the $1^{st}$ frame with the encryption key for the $n^{th}$ line in the $1^{st}$ frame, to obtain line encrypted video data of the $n^{th}$ line in the $1^{st}$ frame.

Step S26, transmitting the line encrypted video data of the $n^{th}$ line in the $1^{st}$ frame to the receiving end.

Step S27, acquiring a line data digest of an $N^{th}$ line in an $(m-1)^{th}$ frame, and generating an encryption key for a $1^{st}$ line in an $m^{th}$ frame, based on a line data digest of the $N^{th}$ line in the $(m-1)^{th}$ frame, where m is an integer greater than or equal to 2; and the $N^{th}$ line is a last line in the $(m-1)^{th}$ frame.

In an embodiment of the present disclosure, the video frames include M frames, where M is a positive integer. For any frame starting with a $2^{rd}$ frame, the encryption key for the $1^{st}$ line is determined based on the line data digest of the last line in the previous frame. That is, the encryption key for the $1^{st}$ line in the $m^{th}$ frame is determined based on the line data digest of the $N^{th}$ line in the $(m-1)^{th}$ frame (i.e., the line data digest of the last line in the $(m-1)^{th}$ frame).

Illustratively, the line data digest of the $n^{th}$ line in the $(m-1)^{th}$ frame is calculated with the SHA-128 algorithm, to obtain a 128-bit hash value, which is the encryption key for the line data of the $1^{st}$ line in the $m^{th}$ frame.

Step S28, encrypting video data of the $1^{st}$ line in the $m^{th}$ frame, with the encryption key for the $1^{st}$ line in the $m^{th}$ frame, to obtain line encrypted video data of the $1^{st}$ line in the $m^{th}$ frame.

Step S29, transmitting the line encrypted video data of the $1^{st}$ line in the $m^{th}$ frame to the receiving end.

Step S210, acquiring a line data digest of an $(n-1)^{th}$ line in an $m^{th}$ frame, and generating an encryption key for an $n^{th}$ line in an $m^{th}$ frame based on the line data digest of the $(n-1)^{th}$ line in the $m^{th}$ frame.

In an embodiment of the present disclosure, in the $m^{th}$ frame, the encryption key for a line other than the $1^{st}$ line is determined based on the line data digest of a previous line in the current frame. Illustratively, the SHA-128 algorithm is used to calculate the line data digest of the $(n-1)^{th}$ line in the $m^{th}$ frame, to obtain a 128-bit hash value, which is the encryption key for the line data of the $n^{th}$ line in the $m^{th}$ frame.

Step S211, encrypting line video data of the $n^{th}$ line in the $m^{th}$ frame with the encryption key for the $n^{th}$ line in the $m^{th}$ frame, to obtain line encrypted video data of the $n^{th}$ line in the $m^{th}$ frame.

Step S212, transmitting the line encrypted video data of the $n^{th}$ line in the $m^{th}$ frame to the receiving end.

In some embodiments, prior to the step S22 of encrypting line video data of the $1^{st}$ line in the $1^{st}$ frame with the encryption key for the $1^{st}$ line in the $1^{st}$ frame, to obtain line encrypted video data of the $1^{st}$ line in the $1^{st}$ frame, the method further includes:

Storing the encryption key for the $1^{st}$ line in the $1^{st}$ frame in a preset first storage module; receiving the line video data of the $1^{st}$ line in the $1^{st}$ frame, and caching the line video data of the $1^{st}$ line in the $1^{st}$ frame; and monitoring a cache state of the video data of the $1^{st}$ line in the $1^{st}$ frame.

The first storage module is used for storing an encryption key for each line in each frame. In some embodiments, the first storage module has a storage depth of 2 keys with a storage depth of 128 bits.

In some embodiments, when the transmitting end receives the line video data of the $1^{st}$ line in the $1^{st}$ frame, the received line video data is cached in a first data cache module. In the caching process, a cache state of the line video data of the $1^{st}$ line in the $1^{st}$ frame is monitored, to ensure that encryption is performed upon the caching of the line video data of the $1^{st}$ line in the $1^{st}$ frame is completed. The cache state of the video data of the $1^{st}$ line in the $1^{st}$ frame includes a cache completed state (that is, the video data of the $1^{st}$ line in the $1^{st}$ frame are fully cached in the first data cache module) and a cache uncompleted state (that is, the video data of the $1^{st}$ line in the $1^{st}$ frame are not fully cached in the first data cache module). The first data cache module is used for caching the line video data, to realize the subsequent symmetric encryption of the line video data.

In an embodiment of the present disclosure, the encryption is performed upon the caching of the line video data of the $1^{st}$ line in the $1^{st}$ frame is completed, so that the line encrypted video data of the $1^{st}$ line in the $1^{st}$ frame can be prevented from being incomplete.

In some embodiments, the line video data is required to be cached when calculating the encryption key, which is shifted one line backward with respect to the corresponding line video data. In the process of encrypting the line video data, the line video data also is required to be shifted backward in order to synchronize the line video data and the encryption key.

Figure 2:
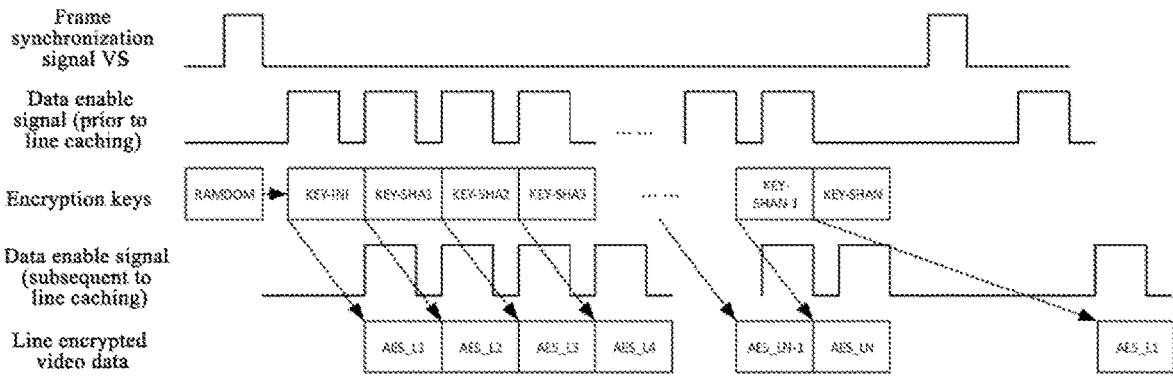
FIG. 2 is a timing diagram illustrating a process of encrypting line video data according to an embodiment of the present disclosure.

FIG. 2 is a timing diagram illustrating a process of encrypting line video data according to an embodiment of the present disclosure. In the figure, a first row illustrates a waveform of a frame synchronization signal of the video frame, a second row illustrates a waveform of an enable signal of the line video data prior to line caching, a third line illustrates the encryption keys KEY-INI, KEY-SHA1, KEY-SHA2, KEY-SHAN-1, KEY-SHAN for respective lines, a fourth row illustrates a waveform of the enable signal of the line video data subjected to the line caching, and a fifth row illustrates the line encrypted video data (ciphertext data). As shown in FIG. 2, the enable signal of the line video data is integrally shifted backward by one line after being cached, and the line encrypted video data ASE-L1, ASE-L2, . . . , ASE-LN-1, ASE-LN are generated.

In some embodiments, the step S22 of encrypting line video data of the $1^{st}$ line in the $1^{st}$ frame with the encryption key for the $1^{st}$ line in the $1^{st}$ frame, to obtain line encrypted video data of the $1^{st}$ line in the $1^{st}$ frame, includes:

If the cache state of the line video data of the $1^{st}$ line in the $1^{st}$ frame is that all the line video data of the $1^{st}$ line in the $1^{st}$ frame are cached, encrypting cached line video data of the $1^{st}$ line in the $1^{st}$ frame with the encryption key for the $1^{st}$ line in the $1^{st}$ frame, to obtain the line encrypted video data of the $1^{st}$ line in the $1^{st}$ frame.

In some embodiments, the step S23 of transmitting the line encrypted video data of the $1^{st}$ line in the $1^{st}$ frame to the receiving end, includes:

Superposing the line encrypted video data of the $1^{st}$ line in the $1^{st}$ frame with the random number, to obtain line superposed video data of the $1^{st}$ line in the $1^{st}$ frame; matching the line superposed video data of the $1^{st}$ line in the $1^{st}$ frame with a timing signal subjected to the line caching, to obtain a line video signal of the $1^{st}$ line in the $1^{st}$ frame; and transmitting the line video signal of the $1^{st}$ line in the $1^{st}$ frame to the receiving end.

In the embodiment of the present disclosure, the random number together with the line encrypted video data of the $1^{st}$ line in the $1^{st}$ frame are transmitted to the receiving end, so that no additional signaling or transmission instruction is required, and network resources are saved.

In the embodiment of the present disclosure, the purpose of the superposing the line encrypted video data of the $1^{st}$ line in the $1^{st}$ frame with the random number is to transmit the random number to the receiving end during the frame blanking period of the video stream data, so that the receiving end generates an initial decryption key based on the random number.

Since the line caching is performed on the line video data in the encryption process, the line video data is integrally shifted backwards by one line. In order to ensure synchronization between the timing signal and the line video data, the timing signal is required to be cached by a timing cache. Illustratively, the superposition of the random numbers begins at a fall edge of the frame synchronization signal.

Figure 3:
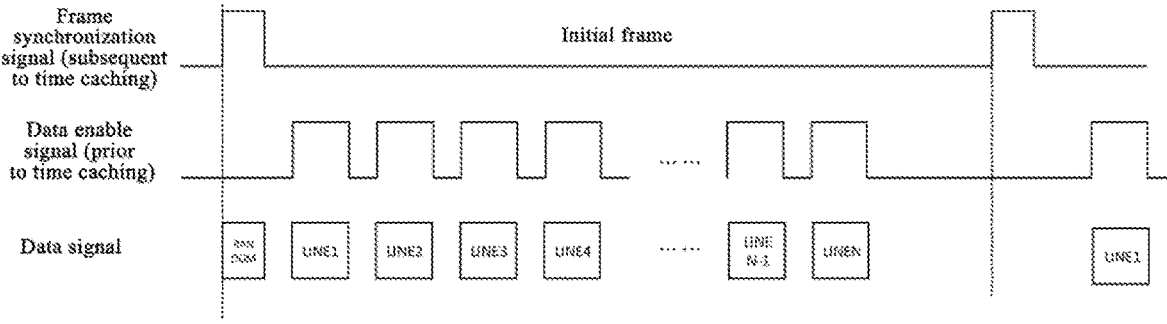
FIG. 3 is a timing diagram illustrating a caching process of timing signals according to an embodiment of the present disclosure.

FIG. 3 is a timing diagram illustrating a caching process of timing signals according to an embodiment of the present disclosure. In the figure, a first row illustrates a waveform of the cached frame synchronization signal, a second row illustrates a waveform of the cached enable signal of data, and a third row illustrates the data signals RANDOM, LINE1, LINE2, . . . , LINE-1, LINE.

In some embodiments, the random number is transmitted to the receiving end during the frame blanking period of video signal of the $1^{st}$ line in the $1^{st}$ frame.

The random number is superposed with the line encrypted video data of the $1^{st}$ line in the $1^{st}$ frame. When the line encrypted video data of the $1^{st}$ line in the $1^{st}$ frame are transmitted, the random number is transmitted to the receiving end together with the line encrypted video data of the $1^{st}$ line in the $1^{st}$ frame. Further, and the random number is transmitted to the receiving end in the frame blanking period of the line video signal of the $1^{st}$ line in the $1^{st}$ frame.

In some embodiments, prior to the step S25 of encrypting line video data of the $n^{th}$ line in the $1^{st}$ frame with the encryption key for the $n^{th}$ line in the $1^{st}$ frame, to obtain line encrypted video data of the $n^{th}$ line in the $1^{st}$ frame, the method further includes:

Storing the encryption key for the $n^{th}$ line in the $1^{st}$ frame in a preset first storage module; receiving the line video data of the $n^{th}$ line in the $1^{st}$ frame, and caching the line video data of the $n^{th}$ line in the $1^{st}$ frame; and monitoring a cache state of the line video data of the $n^{th}$ line in the $1^{st}$ frame.

In the embodiment of the present disclosure, the manner and the effect of caching the line video data of the $n^{th}$ line in the $1^{st}$ frame are the same as those of caching the line video data of the $1^{st}$ line in the $1^{st}$ frame, and the manner and the effect of monitoring the line video data of the $n^{th}$ line in the $1^{st}$ frame are the same as those of monitoring the line video data of the $1^{st}$ line in the $1^{st}$ frame, which are not repeated herein.

In some embodiments, the step S25 of encrypting line video data of the $n^{th}$ line in the $1^{st}$ frame with the encryption key for the $n^{th}$ line in the $1^{st}$ frame, to obtain line encrypted video data of the $n^{th}$ line in the $1^{st}$ frame, includes:

If the cache state of the line video data of the $n^{th}$ line in the $1^{st}$ frame is that all the line video data of the $n^{th}$ line in the $1^{st}$ frame are cached, encrypting cached line video data of the $n^{th}$ line in the $1^{st}$ frame with the encryption key for the $n^{th}$ line in the $1^{st}$ frame, to obtain the line encrypted video data of the $n^{th}$ line in the $1^{st}$ frame.

In some embodiments, the step S26 of transmitting the line encrypted video data of the $n^{th}$ line in the $1^{st}$ frame to the receiving end, includes:

Matching the line encrypted video data of the $n^{th}$ line in the $1^{st}$ frame with a timing signal subjected to the caching, to obtain a line video signal of the $n^{th}$ line in the $1^{st}$ frame; and transmitting the line video signal of the $n^{th}$ line in the $1^{st}$ frame to the receiving end.

In the embodiment of the present disclosure, the line encrypted video data of the $n^{th}$ line in the $1^{st}$ frame are matched with the timing signal subjected to the caching, so that the line encrypted video data of the $n^{th}$ line in the $1^{st}$ frame are synchronized with the timing signal, to form the line video signal of the $n^{th}$ line in the $1^{st}$ frame, and the line encrypted video data of the $n^{th}$ line in the $1^{st}$ frame can be transmitted to the receiving end through the line video signal of the $n^{th}$ line in the $1^{st}$ frame.

In some embodiments, prior to the step S28 of encrypting video data of the $1^{st}$ line in the $m^{th}$ frame, with the encryption key for the $1^{st}$ line in the $m^{th}$ frame, to obtain line encrypted video data of the $1^{st}$ line in the $m^{th}$ frame, the method further includes:

Storing the encryption key for the $1^{st}$ line in the $m^{th}$ frame in a preset first storage module; receiving the line video data of the $1^{st}$ line in the $m^{th}$ frame, and caching the line video data of the $1^{st}$ line in the $m^{th}$ frame; and monitoring a cache state of the line video data of the $1^{st}$ line in the $m^{th}$ frame.

In the embodiment of the present disclosure, the manner of caching the line video data of the $1^{st}$ line in the $m^{th}$ frame is the same as the manner of caching the line video data of the $1^{st}$ line in the $1^{st}$ frame, and the manner of monitoring the cache state of the line video data of the $1^{st}$ line in the $m^{th}$ frame is the same as the manner of monitoring the cache state of the line video data of the $1^{st}$ line in the $1^{st}$ frame, which are not repeated herein.

In some embodiments, the step S28 of encrypting line video data of the $1^{st}$ line in the $m^{th}$ frame, with the encryption key for the $1^{st}$ line in the $m^{th}$ frame, to obtain line encrypted video data of the $1^{st}$ line in the $m^{th}$ frame, includes:

If the cache state of the line video data of the $1^{st}$ line in the $m^{th}$ frame is that all the line video data of the $1^{st}$ line in the $m^{th}$ frame are cached, encrypting the line video data of the $1^{st}$ line in the $m^{th}$ frame subjected to the line caching with the encryption key for the $1^{st}$ line in the $m^{th}$ frame, to obtain the line encrypted video data of the $1^{st}$ line in the $m^{th}$ frame.

In some embodiments, the step S29 of transmitting the line encrypted video data of the $1^{st}$ line in the $m^{th}$ frame to the receiving end, includes:

Matching the line encrypted video data of the $1^{st}$ line in the $m^{th}$ frame with a timing signal subjected to the caching, to obtain a line video signal of the $1^{st}$ line in the $m^{th}$ frame; and transmitting the line video signal of the $1^{st}$ line in the $m^{th}$ frame to the receiving end.

In the embodiment of the present disclosure, the line encrypted video data of the $1^{st}$ line in the $m^{th}$ frame are matched with the cached timing signal, so that the line encrypted video data of the $1^{st}$ line in the $m^{th}$ frame are synchronized with the timing signal, to form the line video signal of the $1^{st}$ line in the $m^{th}$ frame, and the line encrypted video data of the $1^{st}$ line in the $m^{th}$ frame can be transmitted to the receiving end through the line video signal of the $1^{st}$ line in the $m^{th}$ frame.

In some embodiments, prior to the step S211 of encrypting line video data of the $n^{th}$ line in the $m^{th}$ frame with the encryption key for the $n^{th}$ line in the $m^{th}$ frame, to obtain line encrypted video data of the $n^{th}$ line in the $m^{th}$ frame, the method further includes:

Storing the encryption key for the $n^{th}$ line in the $m^{th}$ frame in a preset storage module; receiving line video data of the $n^{th}$ line in the $m^{th}$ frame, and caching the line video data of the $n^{th}$ line in the $m^{th}$ frame; and monitoring a cache state of the line video data of the $n^{th}$ line in the $m^{th}$ frame.

In the embodiment of the present disclosure, the manner of caching the line video data of the $n^{th}$ line in the $m^{th}$ frame is the same as the manner of caching the line video data of the $1^{st}$ line in the $1^{st}$ frame, and the manner of monitoring the cache state of the line video data of the $n^{th}$ line in the $m^{th}$ frame is the same as the manner of monitoring the cache state of the line video data of the $1^{st}$ line in the $1^{st}$ frame, which are not repeated herein.

In some embodiments, the step S211 of encrypting line video data of the $n^{th}$ line in the $m^{th}$ frame with the encryption key for the $n^{th}$ line in the $m^{th}$ frame, to obtain line encrypted video data of the $n^{th}$ line in the $m^{th}$ frame, includes:

If the cache state of the line video data of the $n^{th}$ line in the $m^{th}$ frame is that all the line video data of the $n^{th}$ line in the $m^{th}$ frame are cached, encrypting the line video data of the $n^{th}$ line in the $m^{th}$ frame subjected to the line caching with the encryption key for the $n^{th}$ line in the $m^{th}$ frame, to obtain the line encrypted video data of the $n^{th}$ line in the $m^{th}$ frame.

In some embodiments, the step S212 of transmitting the line encrypted video data of the $n^{th}$ line in the $m^{th}$ frame to the receiving end, includes:

Matching the line encrypted video data of the $n^{th}$ line in the $m^{th}$ frame with the timing signal subjected to the caching, to obtain a line video signal of the $n^{th}$ line in the $m^{th}$ frame; and transmitting the line video signal of the $n^{th}$ line in the $m^{th}$ frame to the receiving end.

In the embodiment of the present disclosure, the line encrypted video data of the $n^{th}$ line in the $m^{th}$ frame are matched with the timing signal subjected to the caching, so that the line encrypted video data of the $n^{th}$ line in the $m^{th}$ frame are synchronized with the timing signal, to form the line video signal of the $n^{th}$ line in the $m^{th}$ frame, and the line encrypted video data of the $n^{th}$ line in the $m^{th}$ frame can be transmitted to the receiving end through the line video signal of the $n^{th}$ line in the $m^{th}$ frame.

In some embodiments, prior to the step S21 of generating the encryption key for the $1^{st}$ line in the $1^{st}$ frame of the video stream to be transmitted based on the random number, the method further includes:

In response to an encryption instruction for encrypting the video stream to be transmitted, monitoring an edge of the frame synchronization signal, and determining a positions of the $1^{st}$ line in the $1^{st}$ frame of the video stream to be transmitted.

The encryption instruction may be transmitted out by a terminal device of the transmitting end. The terminal device of the transmitting end may be an electronic device such as a mobile phone or a server, which is not limited by the embodiment of the present disclosure.

In the video transmission method according to the embodiment of the present disclosure, the transmitting end obtains the encryption key for the first line in the first frame by the random number; for the other lines (the other lines except the first line) of the first frame, obtains the encryption key for the current line with the digital digest of the line video data of the previous line; for the first line of the other frames (the other frames except the first frame), obtains the encryption key with the digital digest of the video data of the last line of the previous frame; for the non-first lines (the other lines except the first line) in the other frames, obtains the encryption key for the current line with the digital digest of the line video data of the previous line in the current frame. Then, the transmitting end encrypts the line video data corresponding to the encryption key with the encryption key. With such a method of encrypting line by line, the security of uncompressed video data during transmission can be improved.

An embodiment of the present disclosure further provides a video transmission method applied to a receiving end. FIG. 4 is a flowchart of a video transmission method according to an embodiment of the present disclosure.

As shown in FIG. 4, the video transmission method according to an embodiment of the present disclosure includes the following steps S401 to S402.

Step S401, acquiring a block data digest of an $(r-1)^{th}$ block in a video stream, and generating a decryption key for an $r^{th}$ block based on the block data digest of the $(r-1)^{th}$ block, where r is an integer greater than or equal to 2.

Step S402, receiving block encrypted video data of the $r^{th}$ block, and decrypting the block encrypted video data of the $r^{th}$ block with the decryption key for the $r^{th}$ block, to obtain block video data of the $r^{th}$ block.

In some embodiments, the receiving end uses the block data digest of the $(r-1)^{th}$ block to generate the decryption key for the $r^{th}$ block, that is, uses the block data digest of a previous block to generate a decryption key for a current block, and decrypts the block encrypted video data block by block, to obtain the corresponding block video data, which can effectively improve the security of the data to be transmitted in the transmission process.

In some embodiments, the video stream to be transmitted is transmitted in the form of block data, i.e. the video stream to be transmitted includes a plurality of consecutive blocks of video data. The block data may be frame data or line data, or may include both the frame data and the line data.

In some embodiments, prior to the receiving block encrypted video data of the $r^{th}$ block and decrypting the block encrypted video data of the $r^{th}$ block with the decryption key for the $r^{th}$ block, to obtain block video data of the $r^{th}$ block, the method further includes:

Storing the decryption key for the $r^{th}$ block in a preset second storage module; caching the received block encrypted video data of the $r^{th}$ block; and monitoring a cache state of the block encrypted video data of the $r^{th}$ block.

In some embodiments, the receiving block encrypted video data of the $r^{th}$ block and decrypting the block encrypted video data of the $r^{th}$ block with the decryption key for the $r^{th}$ block, to obtain block video data of the $r^{th}$ block, includes:

If the cache state of the block encrypted video data of the $r^{th}$ block is that all the block encrypted video data of the $r^{th}$ block are cached, decrypting cached block encrypted video data of the $r^{th}$ block with the decryption key for the $r^{th}$ block, to obtain the block video data of the $r^{th}$ block.

In some embodiments, prior to the acquiring a block data digest of an $(r-1)^{th}$ block in a video stream, and generating a decryption key for an $r^{th}$ block based on the block data digest of the $(r-1)^{th}$ block, the method further includes:

Generating a decryption key for a $1^{st}$ block based on a random number, where the random number is generated by a random number generation module arranged at a transmitting end; and receiving the block encrypted video data of the $1^{st}$ block, and decrypting the block encrypted video data of the $1^{st}$ block with the decryption key for the $1^{st}$ block, to obtain block video data of the $1^{st}$ block.

The random number is generated by a random number generation module. The random number generation module may be a random number generator, or may be other modules or units capable of generating the random number. The random number generation module is not limited by the embodiment of the present disclosure. The random number generation module generates the random numbers when being powered on.

In some embodiments, the receiving end may obtain the decryption key by calculation with a private customized algorithm (e.g., SHA-128). Specifically, the receiving end generates the decryption key (initial decryption key) for the $1^{st}$ line in the $1^{st}$ frame by the private customized algorithm using the random number. Illustratively, the SHA-128 algorithm is used to calculate the random number, to obtain a 128-bit hash value, which is the decryption key for the line data of the $1^{st}$ line in the $1^{st}$ frame.

In a case where the video stream received by the receiving end includes a plurality of video frames, and each frame includes a plurality of lines of video data, in the embodiment of the present disclosure, the decryption may be performed line by line through the following steps, to realize a secure transmission.

In some embodiments, the video stream to be transmitted includes m number of video frames, and each video frame includes N lines of video data, where N is an integer greater than 2. In the embodiment of the present disclosure, an $N^{th}$ line in an $(m-1)^{th}$ frame is defined as a previous frame of a $1^{st}$ line in an $m^{th}$ frame. Thus, the decryption key for the $1^{st}$ line in the $m^{th}$ frame is obtained as described in the following text.

In order to better understand the video transmission method, the following description takes an example that the block data includes M frames of frame data, and each frame of frame data includes N lines of line data.

Step S41, generating the decryption key for the $1^{st}$ line in the $1^{st}$ frame based on the random number, where random number is generated by a random number generation module provided at the transmitting end.

It should be noted that, for the decryption keys at the receiving end, except that the decryption key for the $1^{st}$ line in the $1^{st}$ frame (the first line in the first frame of the video stream) is determined based on the random number, the decryption keys for other lines are each determined based on the line data digest.

Step S42, receiving line encrypted video data of the $1^{st}$ line in the $1^{st}$ frame, and decrypting the line encrypted video data of the $1^{st}$ line in the $1^{st}$ frame, with the decryption key for the $1^{st}$ line in the $1^{st}$ frame, to obtain line video data of the $1^{st}$ line in the $1^{st}$ frame.

Subsequent to receiving the line encrypted video data of the $1^{st}$ line in the $1^{st}$ frame, the receiving end decrypts the line encrypted video data of the $1^{st}$ line in the $1^{st}$ frame with the decryption key for the $1^{st}$ line in the $1^{st}$ frame, thereby obtaining the line video data of the $1^{st}$ line in the $1^{st}$ frame, namely obtaining a plaintext of the line video data of the $1^{st}$ line in the $1^{st}$ frame.

Step S43, acquiring a line data digest of an $(n-1)^{th}$ line in the $1^{st}$ frame, and generating a decryption key for an $n^{th}$ line in the $1^{st}$ frame based on the line data digest of the $(n-1)^{th}$ line in the $1^{st}$ frame, where n is an integer greater than or equal to 2.

In the embodiment of the present disclosure, upon the receiving end obtains the line video data of the $(n-1)^{th}$ line in the $1^{st}$ frame, the line data digest of the $(n-1)^{th}$ line in the $1^{st}$ frame may be obtained from the obtained line video data of the $(n-1)^{th}$ line in the $1^{st}$ frame, and the decryption key for the $(n-1)^{th}$ line in the $1^{st}$ frame may be obtained with a pre-agreed algorithm based on the line data digest of the $(n-1)^{th}$ line in the $1^{st}$ frame. In other words, for each line video data in the $1^{st}$ frame, the decryption key for each of the other lines except for the $1^{st}$ line is calculated based on the line data digest of a previous line with the pre-agreed algorithm.

Step S44, receiving line encrypted video data of the $n^{th}$ line in the $1^{st}$ frame, and decrypting the line encrypted video data of the $n^{th}$ line in the $1^{st}$ frame with the decryption key for the $n^{th}$ line in the $1^{st}$ frame, to obtain line video data of the $n^{th}$ line in the $1^{st}$ frame.

In the embodiment of the present disclosure, subsequent to receiving the line encrypted video data of the $n^{th}$ line in the $1^{st}$ frame, the receiving end decrypts the line encrypted video data of the $n^{th}$ line in the $1^{st}$ frame with the decryption key for the $n^{th}$ line in the $1^{st}$ frame, to obtain the line video data of the $n^{th}$ line in the $1^{st}$ frame. Upon the line video data of the $n^{th}$ line in the $1^{st}$ frame are obtained, the line data digest of the $n^{th}$ line in the $1^{st}$ frame may be obtained from the line video data of the $n^{th}$ line in the $1^{st}$ frame, and the decryption key for a next line may be calculated with the line data digest of the $n^{th}$ line in the $1^{st}$ frame.

Step S45, acquiring line data digest of an $N^{th}$ line in an $(m-1)^{th}$ frame, and generating a decryption key for a $1^{st}$ line in an $m^{th}$ frame based on the line data digest of the $N^{th}$ line in the $(m-1)^{th}$ frame, where m is an integer greater than or equal to 2; and the $N^{th}$ line is a last line in the $(m-1)^{th}$ frame.

In the embodiment of the present disclosure, the decryption key for the $1^{st}$ line of each frame other than the $1^{st}$ frame is obtained based on the line data digest of the last line of a previous frame. Therefore, the decryption key for the $1^{st}$ line in the $m^{th}$ frame is obtained based on the line data digest of the $N^{th}$ line in the $(m-1)^{th}$ frame.

Step S46, receiving line encrypted video data of the $1^{st}$ line in the $m^{th}$ frame, and decrypting the line encrypted video data of the $1^{st}$ line in the $m^{th}$ frame with the decryption key for the $1^{st}$ line in the $m^{th}$ frame, to obtain line video data of the $1^{st}$ line in the $m^{th}$ frame.

In the embodiment of the present disclosure, subsequent to receiving the line encrypted video data of the $1^{st}$ line in the $m^{th}$ frame, the receiving end decrypts the line encrypted video data of the $1^{st}$ line in the $m^{th}$ frame with the decryption key for the $1^{st}$ line in the $m^{th}$ frame, and obtains the line video data of the $1^{st}$ line in the $m^{th}$ frame. Upon the line video data of the $1^{st}$ line in the $m^{th}$ frame are obtained, the line data digest of the $1^{st}$ line in the $m^{th}$ frame may be obtained from the line video data of the $1^{st}$ line in the $m^{th}$ frame, and the decryption key for a $2^{nd}$ line in the $m^{th}$ frame may be calculated with the line data digest of the $1^{st}$ line in the $m^{th}$ frame.

Step S47, acquiring a line data digest of an $(n-1)^{th}$ line in the $m^{th}$ frame, and generating a decryption key for the $n^{th}$ line in the $m^{th}$ frame based on the line data digest of the $(n-1)^{th}$ line in the $m^{th}$ frame.

In the embodiment of the present disclosure, upon the receiving end obtains the line video data of the $(n-1)^{th}$ line in the $m^{th}$ frame, the line data digest of the $(n-1)^{th}$ line in the $m^{th}$ frame may be obtained from the obtained line video data of the $(n-1)^{th}$ line in the $m^{th}$ frame, and a decryption key for the $n^{th}$ line in the $m^{th}$ frame may be obtained with a pre-agreed algorithm based on the line data digest of the $(n-1)^{th}$ line in the $m^{th}$ frame. In other words, for the respective lines of video data in the $m^{th}$ frame, the decryption key for each of the other lines except for the $1^{st}$ line is calculated with pre-agreed algorithm based on the line data digest of a previous line.

Step S48, receiving a line encrypted video data of the $n^{th}$ line in the $m^{th}$ frame, and decrypting the line encrypted video data of the $n^{th}$ line in the $m^{th}$ frame with the decryption key for the $n^{th}$ line in the $m^{th}$ frame, to obtain line video data of the $n^{th}$ line in the $m^{th}$ frame.

Finally, a complete video may be obtained based on the line video data of all lines in all frames.

In some embodiments, prior to the step S402 of decrypting the line encrypted video data of the $1^{st}$ line in the $1^{st}$ frame, with the decryption key for the $1^{st}$ line in the $1^{st}$ frame, to obtain line video data of the $1^{st}$ line in the $1^{st}$ frame, the method further includes:

Storing the decryption key for the $1^{st}$ line in the $1^{st}$ frame in a preset second storage module; caching the received line encrypted video data of the $1^{st}$ line in the $1^{st}$ frame; and monitoring a cache state of the line encrypted video data of the $1^{st}$ line in the $1^{st}$ frame.

The second storage module is used for storing a decryption key for each line in each frame. In some embodiments, the second storage module has a storage depth of 2 keys with a storage depth of 128 bits.

In some embodiments, when the receiving end receives the line encrypted video data of the $1^{st}$ line in the $1^{st}$ frame, the received line encrypted video data is cached in the second line cache module. In the caching process, a cache state of the line encrypted video data of the $1^{st}$ line in the $1^{st}$ frame is monitored, to ensure that the decryption is performed upon the caching of the line encrypted video data of the $1^{st}$ line in the $1^{st}$ frame is completed. The cache state of the line encrypted video data of the $1^{st}$ line in the $1^{st}$ frame includes a cache completed state (that is, the line encrypted video data of the $1^{st}$ line in the $1^{st}$ frame are fully cached in the second line cache module) and a cache uncompleted state (that is, the line encrypted video data of the $1^{st}$ line in the $1^{st}$ frame are not fully cached in the second line cache module).

In the embodiment of the present disclosure, the decryption is performed upon the caching of the line encrypted video data of the $1^{st}$ line in the $1^{st}$ frame is completed, so that it can be prevented from occurring that complete line encrypted video data of the $1^{st}$ line in the $1^{st}$ frame cannot be obtained due to the incomplete line encrypted video data of the $1^{st}$ line in the $1^{st}$ frame.

In some embodiments, the line video data is required to be cached when calculating the decryption key, which is shifted one line backward with respect to the corresponding line video data. In the process of decrypting the line encrypted video data, the line encrypted video data also is required to be shifted backward in order to synchronize the line encrypted video data and the decryption key.

FIG. 5 is a timing diagram illustrating a process of decrypting line encrypted video data according to an embodiment of the present disclosure. In the figure, a first row illustrates a waveform of a frame synchronization signal of the video frame, a second row illustrates a waveform of an enable signal of the video data prior to line caching, a third row illustrates the decryption keys KEY-INI, KEY-SHA1, KEY-SHA2, . . . , KEY-SHAN-1, KEY-SHAN for respective lines, a fourth row illustrates a waveform of the enable signal of the line encrypted video data subjected to the line caching, and a fifth row illustrates the line video data (plaintext of the line video data). As shown in FIG. 5, the enable signal of the line encrypted video data is integrally shifted backward by one line after being cached, and the line video data ASE-L1, ASE-L2, . . . , ASE-LN-1, ASE-LN are generated.

In some embodiments, the step S42 of decrypting the line encrypted video data of the $1^{st}$ line in the $1^{st}$ frame, with the decryption key for the $1^{st}$ line in the $1^{st}$ frame, to obtain line video data of the $1^{st}$ line in the $1^{st}$ frame, includes:

If the cache state of the line encrypted video data of the $1^{st}$ line in the $1^{st}$ frame is that all the line encrypted video data of the $1^{st}$ line in the $1^{st}$ frame are cached, decrypting cached line encrypted video data of the $1^{st}$ line in the $1^{st}$ frame with the decryption key for the $1^{st}$ line in the $1^{st}$ frame, to obtain the line video data of the $1^{st}$ line in the $1^{st}$ frame.

In the embodiment of the present disclosure, the purpose of caching the line encrypted video data of the $1^{st}$ line in the $1^{st}$ frame is to realize symmetric decryption of the line encrypted video data of the $1^{st}$ line in the $1^{st}$ frame with the decryption key for the $1^{st}$ line in the $1^{st}$ frame, and when the cache state of the line encrypted video data of the $1^{st}$ line in the $1^{st}$ frame is that the cache is uncompleted, the line video data of the $1^{st}$ line in the $1^{st}$ frame cannot be obtained by decrypting the line encrypted video data of the $1^{st}$ line in the $1^{st}$ frame.

In some embodiments, prior to the step S404 of decrypting the line encrypted video data of the $n^{th}$ line in the $1^{st}$ frame with the decryption key for the $n^{th}$ line in the $1^{st}$ frame, to obtain line video data of the $n^{th}$ line in the $1^{st}$ frame, the method further includes:

Storing the decryption key for the $n^{th}$ line in the $1^{st}$ frame in a preset second storage module; caching the received line encrypted video data of the $n^{th}$ line in the $1^{st}$ frame; monitoring a cache state of the line encrypted video data of the $n^{th}$ line in the $1^{st}$ frame.

In the embodiment of the present disclosure, the manner and the effect of caching the line encrypted video data of the $n^{th}$ line in the $1^{st}$ frame are the same as those of caching the line encrypted video data of the $1^{st}$ line in the $1^{st}$ frame, and the manner and the effect of monitoring the line encrypted video data of the $n^{th}$ line in the $1^{st}$ frame are the same as those of monitoring the line encrypted video data of the $1^{st}$ line in the $1^{st}$ frame, which are not repeated herein.

In some embodiments, the step S44 of decrypting the line encrypted video data of the $n^{th}$ line in the $1^{st}$ frame with the decryption key for the $n^{th}$ line in the $1^{st}$ frame, to obtain line video data of the $n^{th}$ line in the $1^{st}$ frame, includes:

If the cache state of the line encrypted video data of the $n^{th}$ line in the $1^{st}$ frame is that all the line encrypted video data of the $n^{th}$ line in the $1^{st}$ frame are cached, decrypting cached line encrypted video data of the $n^{th}$ line in the $1^{st}$ frame with the decryption key for the $n^{th}$ line in the $1^{st}$ frame, to obtain the line video data of the $n^{th}$ line in the $1^{st}$ frame.

In some embodiments, prior to the decrypting the line encrypted video data of the $1^{st}$ line in the $m^{th}$ frame with the decryption key for the $1^{st}$ line in the $m^{th}$ frame, to obtain line video data of the $1^{st}$ line in the $m^{th}$ frame, the method further includes:

Storing the decryption key for the $1^{st}$ line in the $m^{th}$ frame in a preset second storage module; receiving line encrypted video data of the $1^{st}$ line in the $m^{th}$ frame, and caching the line encrypted video data of the $1^{st}$ line in the $m^{th}$ frame; and monitoring a cache state of the line encrypted video data of the $1^{st}$ line in the $m^{th}$ frame.

In the embodiment of the present disclosure, the manner of caching the line encrypted video data of the $1^{st}$ line in the $m^{th}$ frame is the same as the manner of caching the line encrypted video data of the $1^{st}$ line in the $1^{st}$ frame, and the manner of monitoring the cache state of the line encrypted video data of the $1^{st}$ line in the $m^{th}$ frame is the same as the manner of monitoring the cache state of the line encrypted video data of the $1^{st}$ line in the $1^{st}$ frame, which are not repeated herein.

In some embodiments, the decrypting the line encrypted video data of the $1^{st}$ line in the $m^{th}$ frame with the decryption key for the $1^{st}$ line in the $m^{th}$ frame, to obtain line video data of the $1^{st}$ line in the $m^{th}$ frame, includes:

If the cache state of the line encrypted video data of the $1^{st}$ line in the $m^{th}$ frame is that all the line encrypted video data of the $1^{st}$ line in the $m^{th}$ frame are cached, decrypting cached line encrypted video data of the $1^{st}$ line in the $m^{th}$ frame with the decryption key for the $1^{st}$ line in the $m^{th}$ frame, to obtain the line video data of the $1^{st}$ line in the $m^{th}$ frame.

In some embodiments, prior to the step S48 of decrypting the line encrypted video data of the $n^{th}$ line in the $m^{th}$ frame with the decryption key for the $n^{th}$ line in the $m^{th}$ frame, to obtain line video data of the $n^{th}$ line in the $m^{th}$ frame, the method further includes:

Storing the decryption key for the $n^{th}$ line in the $m^{th}$ frame in a preset second storage module; receiving line encrypted video data of $n^{th}$ line in the $m^{th}$ frame, and caching the line encrypted video data of the $n^{th}$ line in the $m^{th}$ frame; and monitoring a cache state of the line encrypted video data of the $n^{th}$ line in the $m^{th}$ frame.

In the embodiment of the present disclosure, the manner of caching the line encrypted video data of the $n^{th}$ line in the $m^{th}$ frame is the same as the manner of caching the line encrypted video data of the $1^{st}$ line in the $1^{st}$ frame, and the manner of monitoring the cache state of the line encrypted video data of the $n^{th}$ line in the $m^{th}$ frame is the same as the manner of monitoring the cache state of the line encrypted video data of the $1^{st}$ line in the $1^{st}$ frame, which are not repeated herein.

In some embodiments, the step S408 of decrypting the line encrypted video data of the $n^{th}$ line in the $m^{th}$ frame with the decryption key for the $n^{th}$ line in the $m^{th}$ frame, to obtain line video data of the $n^{th}$ line in the $m^{th}$ frame, includes:

If the cache state of the line encrypted video data of the $n^{th}$ line in the $m^{th}$ frame is that all the line encrypted video data of the $n^{th}$ line in the $m^{th}$ frame are cached, decrypting cached line encrypted video data of the $n^{th}$ line in the $m^{th}$ frame with the decryption key for the $n^{th}$ line in the $m^{th}$ frame, to obtain the line video data of the $n^{th}$ line in the $m^{th}$ frame.

In some embodiments, in response to a key receiving instruction transmitted by a transmitting end, an edge of a frame synchronization signal is detected, and a random number is acquired at the edge of the frame synchronization signal.

In the embodiment of the present disclosure, subsequent to receiving, by a second COM module of the receiving end, the key receiving instruction transmitted by the transmitting end, the receiving end starts detecting the frame synchronization signal, and acquires the random number at an edge of the frame synchronization signal. The edge of the frame synchronization signal may be a rise edge of the frame synchronization signal or a fall edge of the frame synchronization signal.

In the video transmission method according to an embodiment of the present disclosure, the receiving end obtains the decryption key for the first line in the first frame by the random number; for the other lines (the other lines except the first line) of the first frame, obtains the decryption key for the current line with the digital digest of the line video data of the previous line; for the first line of each of the other frames (the other frames except the first frame), obtains the decryption key with the digital digest of the line video data of the last line of the previous frame; for the non-first lines in the other frames, obtains the decryption key for the current line with the digital digest of the video data of the previous line in the current frame. Then, the receiving end decrypts the line encrypted video data corresponding to the encryption key with the encryption key, to obtain the line video data. With such a method of decrypting line by line, the security of uncompressed video data during transmission can be improved.

An embodiment of the present disclosure further provides a video transmission apparatus, which is applied to a transmitting end and can improve the security of uncompressed video data in the transmission process.

FIG. 6 is a schematic diagram illustrating a structure of a video transmission apparatus according to an embodiment of the present disclosure. As shown in FIG. 6, the video transmission apparatus 600 according to an embodiment of the present disclosure includes:

A first acquisition module 61, configured to acquire block data of a video stream to be transmitted.

A first encryption key generation module 62, configured to generate an encryption key for an $r^{th}$ block with a block data digest of an $(r-1)^{th}$ block, where r is an integer greater than or equal to 2.

An encryption module 63, configured to encrypt block video data of the $r^{th}$ block with the encryption key for the $r^{th}$ block, to obtain block encrypted video data of the $r^{th}$ block.

A transmission module 64, configured to transmit the block encrypted video data of the $r^{th}$ block to a receiving end.

In some embodiments, the video transmission apparatus further includes:

A first storage module 67, configured to store the encryption key for the $r^{th}$ block; and A first data cache module 68, configured to cache block video data of the $r^{th}$ block, and detect a cache state of the block video data of the $r^{th}$ block.

In some embodiments, the video transmission apparatus further includes:

A second encryption key generation module 65, configured to generate an encryption key for a $1^{st}$ block of the video stream to be transmitted based on a random number.

The encryption module 63 is further configured to encrypt the block video data of the $1^{st}$ block with the encryption key for the $1^{st}$ block, to obtain block encrypted video data of the $1^{st}$ block.

The transmission module 64 is further configured to transmit the block encrypted video data of the $1^{st}$ block to the receiving end.

In some embodiments, the video transmission apparatus further includes a video signal generation module 610 and a first timing cache module 611, where the video signal generation module includes a superposition unit and a matching unit. Specifically, the video transmission apparatus includes:

A superposition unit, configured to superpose the block encrypted video data of the $1^{st}$ block with the random number, to obtain block superposed video data of the $1^{st}$ block;

A first timing cache module 611, configured to perform block caching on a timing signal; and A matching unit, configured to match the block superposed video data of the $1^{st}$ block with the timing signal subjected to the block caching, to obtain a block video signal of the $1^{st}$ block.

In some embodiments, the video signal generation module 610 is further configured to match the block encrypted video data of the $r^{th}$ block with the cached timing signal, to obtain a block video signal of the $r^{th}$ block.

In some embodiments, the second encryption key generation module 65 is configured to generate an encryption key for a $1^{st}$ line in a $1^{st}$ frame of the video stream to be transmitted based on the random number.

The random number is generated by a random number generation module 60.

The first acquisition module 61 is configured to acquire a line data digest of an $(n-1)^{th}$ line in the $1^{st}$ frame, from the video stream to be transmitted, where n is an integer greater than or equal to 2; to acquire a line data digest of an $N^{th}$ line in an $(m-1)^{th}$ frame, and acquire a line data digest of an $(n-1)^{th}$ line in an $m^{th}$ frame; where both of N and m are integers greater than or equal to 2, the $N^{th}$ line is a last line in the $(m-1)$ frame, and N is an integer greater than or equal to 1.

In some embodiments, the transmitting end receives the video stream to be transmitted through the first acquisition module 61, which acquires the line data digest of each line in each frame from the video stream.

The first encryption key generation module 62 is configured to generate an encryption key for an $n^{th}$ line in the $1^{st}$ frame based on the line data digest of the $(n-1)^{th}$ line in the $1^{st}$ frame; generate an encryption key for a $1^{st}$ line in the $m^{th}$ frame based on the line data digest of the $N^{th}$ line in the $(m-1)^{th}$ frame; and generate an encryption key for an $n^{th}$ line in the $m^{th}$ frame based on the line data digest of the $(n-1)^{th}$ line in the $m^{th}$ frame.

The encryption module 63 is configured to encrypt line video data of the $1^{st}$ line in the $1^{st}$ frame with the encryption key for the $1^{st}$ line in the $1^{st}$ frame, to obtain line encrypted video data of the $1^{st}$ line in the $1^{st}$ frame; encrypt line video data of the $n^{th}$ line in the $1^{st}$ frame with the encryption key for the $n^{th}$ line in the $1^{st}$ frame, to obtain line encrypted video data of the $n^{th}$ line in the $1^{st}$ frame; encrypt line video data of the $1^{st}$ line in the $m^{th}$ frame with the encryption key for the $1^{st}$ line in the $m^{th}$ frame, to obtain line encrypted video data of the $1^{st}$ line in the $m^{th}$ frame; and encrypt line video data of the $n^{th}$ line in the $m^{th}$ frame with the encryption key for the $n^{th}$ line in the $m^{th}$ frame, to obtain line encrypted video data of the $n^{th}$ line in the $m^{th}$ frame.

The transmission module 64 is configured to transmit the line encrypted video data of the $1^{st}$ line in the $1^{st}$ frame, the line encrypted video data of the $n^{th}$ line in the $1^{st}$ frame, the line encrypted video data of the $1^{st}$ line in the $m^{th}$ frame, and the line encrypted video data of the $n^{th}$ line in the $m^{th}$ frame to the receiving end.

In some embodiments, the video transmission apparatus further includes:

A first acquisition module 61, configured to receive the line video data of the $1^{st}$ line in the $1^{st}$ frame, the line video data of the $n^{th}$ line in the $1^{st}$ frame, the line video data of the $1^{st}$ line in the $m^{th}$ frame, and the line video data of the $n^{th}$ line in the $m^{th}$ frame;

A first storage module 67, configured to store the encryption key for the $n^{th}$ line. Specifically, the first storage module 67 is configured to store the encryption key for the $1^{st}$ line in the $1^{st}$ frame, the encryption key for the $n^{th}$ line in the $1^{st}$ frame, the encryption key for the $1^{st}$ line in the $m^{th}$ frame, and the encryption key for the $n^{th}$ line in the $m^{th}$ frame; and A first data cache module 68, configured to cache the line video data of the $n^{th}$ line and detect a cache state of the line video data of the $n^{th}$ line. Specifically, the first data cache module 68 is configured to cache the line video data of the $1^{st}$ line in the $1^{st}$ frame, and monitor a cache state of the line video data of the $1^{st}$ line in the $1^{st}$ frame; cache the line video data of the $n^{th}$ line in the $1^{st}$ frame, and monitor a cache state of the line video data of the $n^{th}$ line in the $1^{st}$ frame; cache the line video data of the $1^{st}$ line in the $m^{th}$ frame, and monitor a cache state of the line video data of the $1^{st}$ line in the $m^{th}$ frame; and cache the line video data of the $n^{th}$ line in the $m^{th}$ frame, and monitor a cache state of the line video data of the $n^{th}$ line in the $m^{th}$ frame.

In some embodiments, the video transmission apparatus further includes a video signal generation module 610 and a first timing cache module 611, where the video signal generation module includes a superposition unit and a matching unit. Specifically, the video transmission apparatus includes:

A first timing cache module 611, configured to perform a line caching on a timing signal;

A superposition unit, configured to superpose the line encrypted video data of the $1^{st}$ line in the $1^{st}$ frame with the random number, to obtain line superposed video data of the $1^{st}$ line in the $1^{st}$ frame; and a matching unit, configured to match the line superposed video data of the $1^{st}$ line in the $1^{st}$ frame with the timing signal subjected to the line caching, to obtain the line video signal of the $1^{st}$ line in the $1^{st}$ frame.

In some embodiments, the video signal generation module 610 is further configured to match the line encrypted video data of the $n^{th}$ line in the $1^{st}$ frame with the cached timing signal, to obtain the line video signal of the $n^{th}$ line in the $1^{st}$ frame; match the line encrypted video data of the $1^{st}$ line in the $m^{th}$ frame with the cached timing signal, to obtain the line video signal of the $1^{st}$ line in the $m^{th}$ frame; and match the line encrypted video data of the $n^{th}$ line in the $m^{th}$ frame with the cached timing signal, to obtain the line video signal of the $n^{th}$ line in the $m^{th}$ frame.

In some embodiments, the video transmission apparatus further includes a random number generation module 60, configured to generate a random number.

The random number generated by the random number generation module 60 is not limited in the embodiment of the present disclosure. For example, the random number may be a 128-bit random number. In some embodiments, the random number generation module 60 generates a random number when powered on.

In some embodiments, the video transmission apparatus further includes a first detection module 69 configured to detect an edge of a frame synchronization signal in response to an encryption instruction for encrypting the video stream to be transmitted, to determine a position of the $1^{st}$ line in the $1^{st}$ frame of the video stream to be transmitted.

The transmitting end receives the encryption instruction through a first COM module 612. For example, the first COM module may receive the encryption instruction through an Inter-Integrated Circuit (IIC) interface of an HDMI (High Definition Multimedia Interface) channel. The encryption instruction is a command for instructing the receiving end and the transmitting end to transmit the video in an encrypted communication manner. The encryption instruction may be transmitted by a user. Alternatively, a trigger condition may be preset, and the encryption instruction is automatically transmitted out if the trigger condition is met.

In the video transmission apparatus according to the embodiment of the present disclosure, the transmitting end obtains the encryption key for the first line in the first frame by the random number; for the other lines (the other lines except the first line) of the first frame, obtains the encryption key for the current line with the digital digest of the line video data of the previous line; for the first line of the other frames (the other frames except the first frame), obtains the encryption key with the digital digest of the line video data of the last line of the previous frame; for the non-first lines in the other frames, obtains the encryption key for the current line with the digital digest of the line video data of the previous line in the current frame. Then, the transmitting end encrypts the line video data corresponding to the encryption key with the encryption key. With such a method of encrypting line by line, the security of uncompressed video data during transmission can be improved.

An embodiment of the present disclosure further provides a video transmission apparatus applied to a receiving end. FIG. 7 is a schematic diagram illustrating a structure of a video transmission apparatus according to an embodiment of the present disclosure.

As shown in FIG. 7, the video transmission apparatus 700 according to an embodiment of the present disclosure includes:

A second acquisition module 71, configured to acquire a block data digest of an $(r-1)^{th}$ block in the video stream;

A first decryption key generation module 72, configured to generate a decryption key for an $r^{th}$ block, based on the block data digest of the $(r-1)^{th}$ block, where r is an integer greater than or equal to 2;

A second receiving module 73, configured to receive block encrypted video data of the $r^{th}$ block; and A decryption module 74, configured to decrypt the block encrypted video data of the $r^{th}$ block with the decryption key for the $r^{th}$ block, to obtain block video data of the $r^{th}$ block.

In some embodiments, the video transmission apparatus 700 further includes:

A second decryption key generation module 75, configured to generate a decryption key for a $1^{st}$ block based on a random number generated by a random number generation module at a transmitting end.

The second receiving module 73 is further configured to receive the block encrypted video data of the $1^{st}$ block.

The decryption module 74 is further configured to decrypt the block encrypted video data of the $1^{st}$ block with the decryption key for the $1^{st}$ block, to obtain block video data of the $1^{st}$ block.

In some embodiments, the video transmission apparatus 700 further includes:

A second storage module 76, configured to store the decryption key for the $r^{th}$ block; and A second data cache module, configured to cache the received block encrypted video data of the $r^{th}$ block and monitor a cache state of the block encrypted video data of the $r^{th}$ block.

In some embodiments, the video transmission apparatus 700 further includes:

A second detection module 79, configured to detect an edge of a frame synchronization signal in response to a key receiving instruction transmitted by the transmitting end; and A random number detection module 710, configured to obtain the random number from the block encrypted video data of the $1^{st}$ block at an edge of the block synchronization signal.

In some embodiments, the second receiving module 73 is configured to receive line encrypted video data of a $1^{st}$ line in a $1^{st}$ frame, line encrypted video data of an $n^{th}$ line in the $1^{st}$ frame, line encrypted video data of a $1^{st}$ line in an $m^{th}$ frame, and line encrypted video data of an $n^{th}$ line in the $m^{th}$ frame.

The second acquisition module 71 is configured to acquire a line data digest of the $1^{st}$ line in the $1^{st}$ frame, line data digest of an $(n-1)^{th}$ line in the $1^{st}$ frame, a line data digest of an $N^{th}$ line in an $(m-1)^{th}$ frame, and a line data digest of an $(n-1)^{th}$ line in the $m^{th}$ frame, from the received line video data, where the $N^{th}$ line is a last line in the $(m-1)^{th}$ frame.

The first decryption key generation module 72 is configured to generate a decryption key for the $n^{th}$ line in the $1^{st}$ frame based on the line data digest of the $(n-1)^{th}$ line in the $1^{st}$ frame, generate a decryption key for the $1^{st}$ line in the $m^{th}$ frame based on the line data digest of the $N^{th}$ line in the $(m-1)^{th}$ frame, and generate a decryption key for the $n^{th}$ line in the $m^{th}$ frame based on the line data digest of the $(n-1)^{th}$ line in the $m^{th}$ frame.

The decryption module 74 is configured to decrypt the line encrypted video data of the $1^{st}$ line in the $1^{st}$ frame with the decryption key for the $1^{st}$ line in the $1^{st}$ frame, to obtain line video data of the $1^{st}$ line in the $1^{st}$ frame; decrypt the line encrypted video data of the $n^{th}$ line in the $1^{st}$ frame with the decryption key for the $n^{th}$ line in the $1^{st}$ frame, to obtain the line video data of the $n^{th}$ line in the $1^{st}$ frame; decrypt the line encrypted video data of the $1^{st}$ line in the $m^{th}$ frame with the decryption key for the $1^{st}$ line in the $m^{th}$ frame, to obtain line video data of the $1^{st}$ line in the $m^{th}$ frame; and decrypt the line encrypted video data of the $n^{th}$ line in the $m^{th}$ frame with the decryption key for the $n^{th}$ line in the $m^{th}$ frame, to obtain the line video data of the $n^{th}$ line in the $m^{th}$ frame.

In some embodiments, the second storage module 76 is configured to store the decryption key for the $1^{st}$ line in the $1^{st}$ frame, the decryption key for the $n^{th}$ line in the $1^{st}$ frame, the decryption key for the $1^{st}$ line in the $m^{th}$ frame, and the decryption key for the $n^{th}$ line in the $m^{th}$ frame.

The second data cache module 77 is configured to cache the line encrypted video data of the $1^{st}$ line in the $1^{st}$ frame, and monitor a cache state of the line encrypted video data of the $1^{st}$ line in the $1^{st}$ frame; cache the line encrypted video data of the $n^{th}$ line in the $1^{st}$ frame, and monitor a cache state of the line encrypted video data of the $n^{th}$ line in the $1^{st}$ frame; cache the line encrypted video data of the $1^{st}$ line in the $m^{th}$ frame, and monitor a cache state of the line encrypted video data of the $1^{st}$ line in the $m^{th}$ frame; and cache the line encrypted video data of the $n^{th}$ line in the $m^{th}$ frame, and monitor a cache state of the line encrypted video data of the $n^{th}$ line in the $m^{th}$ frame.

The video generation module 78 combines the decrypted line video data into a video.

In some embodiments, the second detection module 79 is configured to detect an edge of the frame synchronization signal in response to the key receiving instruction transmitted by the transmitting end.

The random number detection module 710 is configured to obtain the random number from the line encrypted video data of $1^{st}$ line in the $1^{st}$ frame at an edge of the frame synchronization signal.

The receiving end receives the encryption instruction through a second COM module 711. For example, the second COM module may receive the encryption instruction through an Inter-Integrated Circuit (IIC) interface of an HDMI (High Definition Multimedia Interface) channel. The encryption instruction is a command for instructing the receiving end and the transmitting end to transmit the video in an encrypted communication manner. The encryption instruction may be transmitted by a user. Alternatively, a trigger condition may be preset, and the encryption instruction is automatically transmitted out if the trigger condition is met.

In the embodiment of the present disclosure, subsequent to receiving, by the second COM module 711, the key receiving instruction transmitted by the transmitting end, the receiving end starts detecting the frame synchronization signal, and acquires the random number at an edge of the frame synchronization signal. The edge of the frame synchronization signal may be a rise edge of the frame synchronization signal or a fall edge of the frame synchronization signal.

In the video transmission apparatus according to the embodiment of the present disclosure, the receiving end obtains the decryption key for the first line in the first frame by the random number; for the other lines (the other lines except the first line) of the first frame, obtains the decryption key for the current line with the digital digest of the line video data of the previous line; for the first line of the other frames (the other frames except the first frame), obtains the decryption key with the digital digest of the line video data of the last line of the previous frame; for the non-first lines in the other frames, obtains the decryption key for the current line with the digital digest of the line video data of the previous line in the current frame. Then, the receiving end decrypts the line video data corresponding to the encryption key with the encryption key, to obtain the line video data. With such a method of decrypting line by line, the security of uncompressed video data during transmission can be improved.

The following describes the video transmission method according to the embodiment of the present disclosure in further detail with reference to the video transmission apparatus according to the embodiment of the present disclosure.

FIG. 8 is a flowchart of a video transmission method according to an embodiment of the present disclosure. The video transmission method is applied to a transmitting end. As shown in FIGS. 6 and 8, the video transmission method includes the following steps.

In step S801, receiving an encryption instruction transmitted by an encryption key, where the encryption instruction is transmitted through the first COM module.

In step S802, detecting, by the first detection module 69, an edge of the frame synchronization signal, to ensure that a line digital digest calculation is performed on the video stream at the beginning stage.

In step S803, generating, by the random number generation module 60 when powered on, a random number.

In step S804, generating, the first encryption key generation module 62, an encryption key for a $1^{st}$ line in a $1^{st}$ frame through a pre-agreed algorithm based on the random number.

It should be noted that the execution sequence of step S802 and steps S803 and S804 is not limited to the sequence in the embodiment of the present disclosure, and step S802 may be performed synchronously with steps S803 and S804 or later than steps S803 and S804.

In step S805, determining whether the video data is the line video data of the $1^{st}$ line in the $1^{st}$ frame, and if not, the detection is continued; if yes, go to step S806.

In step S806, encrypting the line video data of the $1^{st}$ line in the $1^{st}$ frame with the encryption key for the $1^{st}$ line in the $1^{st}$ frame, to obtain line encrypted data of the $1^{st}$ line in the $1^{st}$ frame. The line video data of the other lines are each encrypted with a corresponding encryption key.

In step S807, calculating an encryption key for a $p^{th}$ line according to a line data digest of a $(p-1)^{th}$ line, where p is an integer greater than or equal to 2.

It should be noted that, for convenience of description, for consecutive video frames, the embodiment of the present disclosure defines a last line of a previous frame and a first line of a current frame as consecutive lines of data, based on which the encryption key for the first line of the current frame is obtained based on the line data digest of the last line of the previous frame.

In step S808, encrypting line video data of the $p^{th}$ line according to the encryption key for the $p^{th}$ line, to obtain line encrypted video data of the $p^{th}$ line.

It should be noted that, since the encryption key for each line is obtained according to the line data digest of the previous line, prior to encrypting the line video data, line caching is required to be performed on each line, so that the line video data matches with the corresponding encryption key.

In step S809, superposing, by the superposition unit, the line encrypted video data with the random number, to obtain line superimposed video data for transmitting the random number to the receiving end during the frame blanking period.

It should be noted that, since the random number is transmitted to the receiving end through the line encrypted video data of the first line in the first frame, the random number is not required to be superimposed with other line encrypted video data, and therefore, except the line encrypted video data of the first line of the first frame, the step S809 is not required to be executed for other lines.

In step S810, matching the line encrypted video data with the cached timing signal to obtain a line video signal, and transmitting the line video signal to the receiving en.

Figures 9, 10:
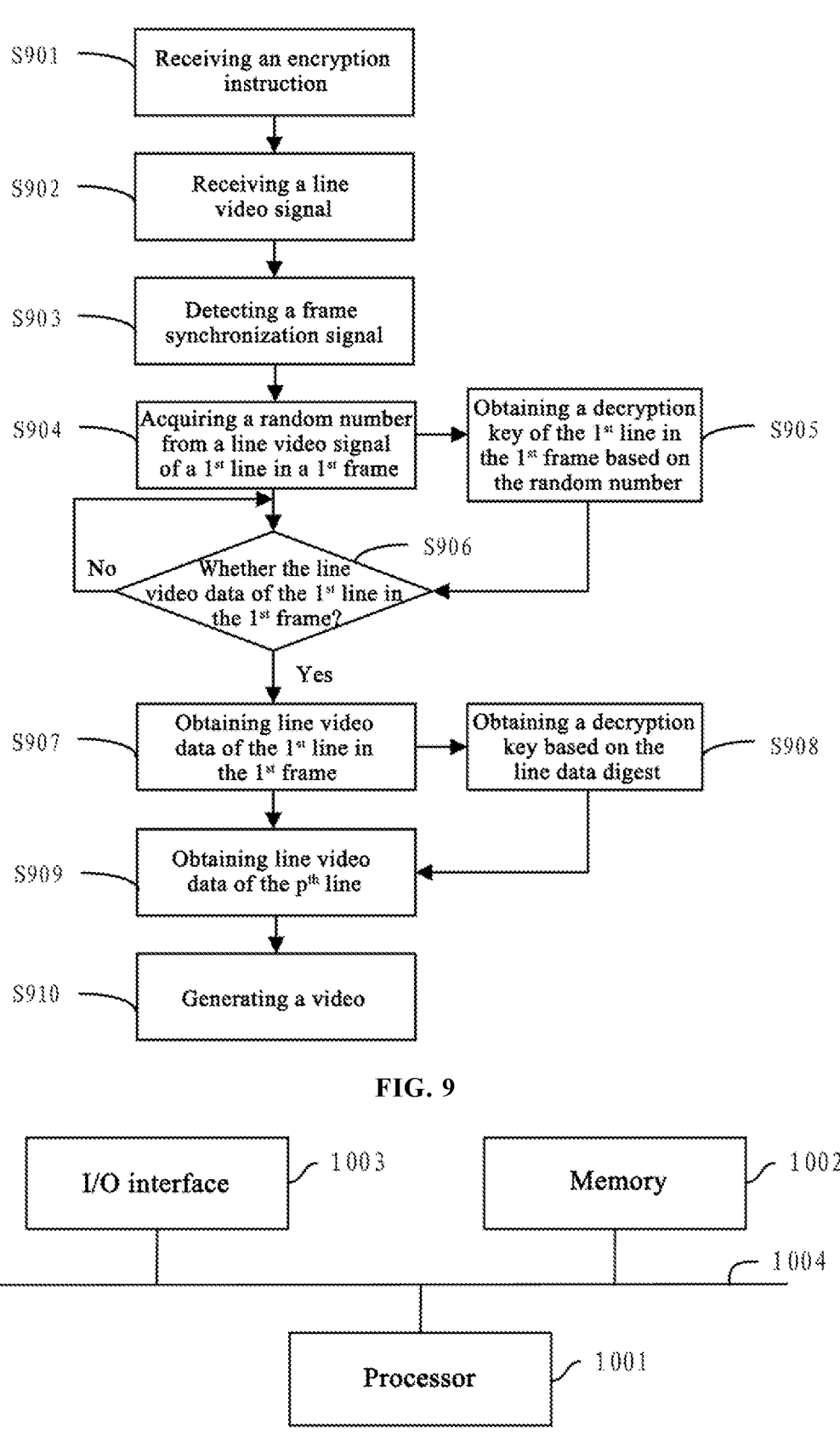
FIG. 9 is a flowchart of a video transmission method according to an embodiment of the present disclosure.
FIG. 10 is a schematic diagram illustrating a structure of an electronic device according to an embodiment of the present disclosure.

FIG. 9 is a flowchart of a video transmission method according to an embodiment of the present disclosure. The video transmission method is applied to a receiving end. As shown in FIGS. 7 and 9, the video transmission method includes the following steps.

In step S901, receiving an encryption instruction from the transmitting end. The encryption instruction is transmitted through the first COM module.

In step S902, receiving, by the second receiving module 73, a line video signal from the transmitting end.

In step S903, detecting, by the second detection module 77, an edge of the frame synchronization signal, to ensure that a line digital digest calculation is performed on the video stream at the beginning stage.

In step S904, acquiring, by the random number detection module 710, a random number from a line video signal of a $1^{st}$ line in a $1^{st}$ frame.

In step S905, obtaining, by the first decryption key generation module 72, a decryption key (an initial key) of the $1^{st}$ line in the $1^{st}$ frame based on the random number. The first decryption key generation module 72 obtains the decryption key for the $1^{st}$ line in the $1^{st}$ frame based on the random number through a pre-agreed algorithm.

In step S906, determining whether the video data is the line video data of the $1^{st}$ line in the $1^{st}$ frame, and if not, the detection is continued; if yes, go to step S907.

In step S907, decrypting, by the decryption module 74, line encrypted video data of the $1^{st}$ line in the $1^{st}$ frame with the decryption key for the $1^{st}$ line in the $1^{st}$ frame, to obtain line video data of the $1^{st}$ line in the $1^{st}$ frame. The line encrypted video data of other lines are each decrypted with a corresponding decryption key.

In step S908, acquiring, by the second acquisition module 71, a line data digest of the $1^{st}$ line in the $1^{st}$ frame from the received line video data, and obtaining, by the second decryption key generation module 73, the decryption key for the $1^{st}$ line in the $1^{st}$ frame based on the line data digest of the $1^{st}$ line in the $1^{st}$ frame.

For convenience of description, for consecutive video frames, the embodiment of the present disclosure defines a last line of a previous frame and a first line of a current frame as consecutive lines of data, based on which the decryption key for the first line of the current frame is obtained based on the line data digest of the last line of the previous frame.

In step S909, decrypting line encrypted video data of a $p^{th}$ line according to decryption key for the $p^{th}$ line, to obtain line video data of the $p^{th}$ line, where p is an integer greater than or equal to 2.

In step S910, obtaining a video based on the line video data of the $1^{st}$ line in the $1^{st}$ frame, the line video data of other lines in the $1^{st}$ frame, and the line video data of the $p^{th}$ line in each of other frames, where the video is a video corresponding to the video stream transmitted by the transmitting end.

It should be noted that, since the decryption key for each line is obtained according to the line data digest of the previous line, prior to decrypting the line video data, line caching is required to be performed on each line, so that the line video data matches with the corresponding decryption key.

In the embodiment of the present disclosure, the transmitting end and the receiving end each may be a terminal electronic device such as a mobile phone, a pad, a computer, or the like.

FIG. 10 is a schematic diagram illustrating a structure of an electronic device according to an embodiment of the present disclosure. As shown in FIG. 10, an embodiment of the present disclosure provides an electronic device including one or more processors 1001, a memory 1002, and one or more I/O (input/output) interfaces 1003. The memory 1002 stores one or more programs that, when executed by the one or more processors, cause the one or more processors to implement the video transmission method in any one of the above embodiments. The one or more I/O interfaces 1003 are coupled between the processor and the memory, and are configured to enable information interaction between the processor and the memory.

The processor 1001 is a device with data processing capability, which includes but is not limited to a central processing unit (CPU), or the like. The memory 1002 is a device having data storage capabilities including, but not limited to, random access memory (RAM, more specifically SDRAM, DDR, etc.), read only memory (ROM), electrically erasable programmable read only memory (EEPROM), flash memory (FLASH). The I/O interface (read/write interface) 1003 coupled between the processor 1001 and the memory 1002 may enable information interaction between the processor 1001 and the memory 1002, which may include, but is not limited to, a data bus (Bus), or the like.

In some embodiments, the processor 1001, the memory 1002, and the I/O interface 1003 are connected to each other through a bus 1004, and in turn to other components of the computing device.

According to an embodiment of the present disclosure, a non-transitory computer readable medium is further provided. The non-transitory computer readable medium stores thereon a computer program which, when being executed by a processor, implements steps in any one video transmission method in the above embodiments.

In particular, according to an embodiment of the present disclosure, the process described above with reference to the flow chart may be implemented as a computer software program. For example, an embodiment of the present disclosure includes a computer program product including a computer program carried on a machine readable medium, where the computer program includes program codes for performing the method illustrated by the flow chart. In such an embodiment, the computer program may be downloaded and installed from a network via a communication part, and/or installed from a removable medium. The above functions defined in the system of the present disclosure are performed when the computer program is performed by a Central Processing Unit (CPU).

It should be noted that the non-transitory computer readable medium shown in the present disclosure may be a computer readable signal medium, a computer readable storage medium, or any combination of the two. A computer readable storage medium may be, for example, but not limited to, an electronic, magnetic, optical, electromagnetic, infrared, or semiconductor system, apparatus, or device, or any combination thereof. More specific examples of the computer readable storage medium may include, but are not limited to, an electrical connection having one or more wires, a portable computer diskette, a hard disk, a Random Access Memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination thereof. In the present disclosure, a computer readable storage medium may be any tangible medium that contains or stores a program, which can be used by or in connection with an instruction execution system, apparatus, or device. In contrast, in the present disclosure, a computer readable signal medium may include a propagated data signal with computer readable program code carried therein, in a baseband or as a part of a carrier wave. Such a propagated data signal may take any of a variety of forms, including, but not limited to, electro-magnetic signal, optical signal, or any suitable combination thereof. A computer readable signal medium may also be any non-transitory computer readable medium other than a computer readable storage medium, which may transmit, propagate, or convey a program for use by or in connection with an instruction execution system, apparatus, or device. The program codes on the non-transitory computer readable medium may be conveyed by any appropriate medium, including but not limited to wireless, a wire, fiber optic cable, RF, etc., or any suitable combination thereof.

The flowchart and block diagram in the figures illustrate an architecture, functionality, and operation possibly implemented by the system, the method and the computer program product according to various embodiments of the present disclosure. In this regard, each block in the flowchart or block diagram may represent a module, a program segment, or a part of codes, which includes one or more executable instructions for implementing a specified logical function. It should also be noted that, in some alternative implementations, the function noted in the block may occur in a different order from that noted in the figures. For example, two blocks shown in succession may, in fact, be executed substantially concurrently, or the blocks may sometimes be executed in a reverse order, depending upon the functionality involved. It should also be noted that each block in the block diagram and/or the flowchart, and combinations of blocks in the block diagram and/or the flowchart, may be implemented by a special purpose hardware-based system that performs the specified function or act, or by a combination of a special purpose hardware and computer instructions.

It should be noted that, in the present disclosure, the terms "comprise", "include", or any other variation thereof, are intended to encompass a non-exclusive inclusion, such that a process, method, article, or apparatus that comprises a list of elements includes not only those elements but also other elements not expressly listed or inherent to such process, method, article, or apparatus. Without further limitation, an element defined by the phrase "comprising a/an . . . " does not exclude the presence of additional identical elements in the process, method, article, or apparatus that comprises the element.

It will be understood that the above embodiments are merely exemplary embodiments adopted to illustrate the principles of the present disclosure, and the present disclosure is not limited thereto. It will be apparent to one of ordinary skill in the art that various modifications and improvements can be made without departing from the spirit and scope of the present disclosure, and such modifications and improvements are also considered to be within the scope of the present disclosure.

What is claimed is:

1. A video transmission method applied to a transmitting end, comprising:

acquiring block data of a video stream to be transmitted;

generating an encryption key for an $r^{th}$ block with a block data digest of an $(r-1)^{th}$ block, wherein the $r^{th}$ blocks comprises data to be transmitted at an $r^{th}$ time by the transmitting end, and r is an integer greater than or equal to 2;

encrypting block video data of the $r^{th}$ block with the encryption key for the $r^{th}$ block, to obtain block encrypted video data of the $r^{th}$ block; and transmitting the block encrypted video data of the $r^{th}$ block to a receiving end, wherein prior to the encrypting block video data of the $r^{th}$ block with the encryption key for the $r^{th}$ block, to obtain block encrypted video data of the $r^{th}$ block, the video transmission method further comprises:

storing the encryption key for the $r^{th}$ block in a preset first storage module;

receiving the block video data of the $r^{th}$ block, and caching the block video data of the $r^{th}$ block; and monitoring a cache state of the block video data of the $r^{th}$ block, wherein the encrypting block video data of the $r^{th}$ block with the encryption key for the $r^{th}$ block, to obtain block encrypted video data of the $r^{th}$ block, comprises:

encrypting cached block video data of the $r^{th}$ block with the encryption key for the $r^{th}$ block, to obtain the block encrypted video data of the $r^{th}$ block, in response to the cache state of the block video data of the $r^{th}$ block is that all the block video data of the $r^{th}$ block are cached.

2. The video transmission method according to claim 1, wherein the transmitting the block encrypted video data of the $r^{th}$ block to a receiving end, comprises:

matching the block encrypted video data of the $r^{th}$ block with a cached timing signal, to obtain a block video signal of the $r^{th}$ block; and transmitting the block video signal of the $r^{th}$ block to the receiving end.

3. The video transmission method according to claim 1, wherein prior to the generating an encryption key for an $r^{th}$ block of data, with a block data digest of an $(r-1)^{th}$ block, the video transmission method further comprises:

generating an encryption key for a $1^{st}$ block of the video stream to be transmitted based on a random number, wherein the random number is generated by a random number generation module;

encrypting block video data of the $1^{st}$ block with the encryption key for the $1^{st}$ block, to obtain block encrypted video data of the $1^{st}$ block; and transmitting the block encrypted video data of the $1^{st}$ block to the receiving end.

4. The video transmission method according to claim 3, wherein the random number is transmitted to the receiving end during a block blanking period of a video signal of the $1^{st}$ block.

5. The video transmission method according to claim 1, wherein the block data comprises any one of frame data or line data.

6. The video transmission method according to claim 1, wherein the block data comprises M frames of frame data, each of the M frames of frame data comprises N lines of line data, wherein N is an integer greater than 2; and the video transmission method further comprises:

generating an encryption key for a $1^{st}$ line in an $m^{th}$ frame, based on a line data digest of an $N^{th}$ line in an $(m-1)^{th}$ frame;

encrypting video data of the $1^{st}$ line in the $m^{th}$ frame, with the encryption key for the $1^{st}$ line in the $m^{th}$ frame, to obtain line encrypted video data of the $1^{st}$ line in the $m^{th}$ frame; and transmitting the line encrypted video data of the $1^{st}$ line in the $m^{th}$ frame to the receiving end.

7. The video transmission method according to claim 3, wherein prior to the generating an encryption key for a $1^{st}$ block of the video stream to be transmitted based on a random number, the video transmission method further comprises:

monitoring an edge of a frame synchronization signal in response to an encryption instruction for encrypting the video stream to be transmitted, and determining a positions of the $1^{st}$ block of the video stream to be transmitted.

8. A video transmission apparatus applied to a transmitting end, wherein the video transmission apparatus is configured to implement the video transmission method according to claim 1, and comprises:

a first acquisition module, configured to acquire block data of a video stream to be transmitted;

a first encryption key generation module, configured to generate an encryption key for an $r^{th}$ block with a block data digest of an $(r-1)^{th}$ block, wherein the $r^{th}$ blocks comprises data to be transmitted at an $r^{th}$ time by the transmitting end, and r is an integer greater than or equal to 2;

an encryption module, configured to encrypt block video data of the $r^{th}$ block with the encryption key for the $r^{th}$ block, to obtain block encrypted video data of the $r^{th}$ block; and a transmission module, configured to transmit the block encrypted video data of the $r^{th}$ block to a receiving end, wherein the video transmission apparatus further comprises:

a first storage module, configured to store the encryption key for the $r^{th}$ block;

a first data cache module, configured to receive the block video data of the $r^{th}$ block, each the block video data of the $r^{th}$ block, and monitor a cache state of the block video data of the $r^{th}$ block, wherein the encryption module is configured to:

encrypt cached block video data of the $r^{th}$ block with the encryption key for the $r^{th}$ block, to obtain the block encrypted video data of the $r^{th}$ block, in response to the cache state of the block video data of the $r^{th}$ block is that all the block video data of the $r^{th}$ block are cached.

9. An electronic device, comprising:

one or more processors; and a memory for storing one or more programs which, when being executed by the one or more processors, cause the one or more processors to implement the video transmission method according to claim 1.

10. A non-transitory computer readable storage medium storing a computer program which, when being executed by a processor, implements steps in the video transmission method according to claim 1.

* * * * *